United States Patent
Park et al.

(10) Patent No.: US 11,507,311 B2
(45) Date of Patent: Nov. 22, 2022

(54) STORAGE DEVICE FOR ACCELERATING WRITE SPEED AND READ SPEED

(71) Applicant: SAMSUNG ELECTRONICS CO., LTD., Suwon-si (KR)

(72) Inventors: Jeong-Woo Park, Hwaseong-si (KR); Dong-Min Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 16/895,288

(22) Filed: Jun. 8, 2020

(65) Prior Publication Data

US 2021/0034296 A1 Feb. 4, 2021

(30) Foreign Application Priority Data

Aug. 1, 2019 (KR) .................. 10-2019-0094034

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ...... G06F 3/0602; G06F 3/0604; G06F 3/061; G06F 3/0611; G06F 3/0614; G06F 3/0644; G06F 3/0646; G06F 3/0647; G06F 3/0656; G06F 3/0658; G06F 3/0659; G06F 3/0679; G06F 12/0246; G06F 2212/7202
See application file for complete search history.

(56) References Cited

U.S. PATENT DOCUMENTS

| | | | |
|---|---|---|---|
| 6,732,124 B1 | 5/2004 | Koseki et al. | |
| 7,159,069 B2 | 1/2007 | Adusumilli et al. | |
| 7,620,773 B2 | 11/2009 | Nicholson et al. | |
| 8,489,817 B2 | 7/2013 | Flynn et al. | |
| 8,621,144 B2 | 12/2013 | Eschmann et al. | |
| 8,886,877 B1 * | 11/2014 | Avila ................ | G06F 12/0638 711/103 |
| 9,229,854 B1 * | 1/2016 | Kuzmin ............ | G06F 11/1072 |
| 9,715,455 B1 | 7/2017 | Purkayastha et al. | |
| 10,061,521 B2 * | 8/2018 | Yun ................ | G06F 3/0665 |
| 2003/0046482 A1 | 3/2003 | Venkiteswaran | |
| 2006/0149890 A1 * | 7/2006 | Gorobets ............ | G11C 8/12 711/103 |
| 2006/0184718 A1 * | 8/2006 | Sinclair ............ | G06F 3/0652 711/103 |
| 2007/0168607 A1 | 7/2007 | Takai et al. | |
| 2014/0304475 A1 | 10/2014 | Ramanujan et al. | |

(Continued)

*Primary Examiner* — Larry T Mackall
(74) *Attorney, Agent, or Firm* — F. Chau & Associates, LLC

(57) ABSTRACT

A storage device including a nonvolatile memory device is described. The storage device includes a controller that receives a write command and data from an external host device. The controller preferentially writes the data in an area based on a normal write policy when the data is associated with a normal write, and in an area based on a turbo write policy when the data is associated with a turbo write. The controller may also receive a read command, to read data from an area based on the read command, and output the data to the external host device. The controller may also move the data in response to move information of the read command when the read command is received together with move information.

19 Claims, 22 Drawing Sheets

(56) References Cited

U.S. PATENT DOCUMENTS

2017/0068456 A1* 3/2017 Toge .................. G06F 11/1076
2017/0070574 A1 3/2017 Sawada
2017/0131917 A1 5/2017 Yun et al.

* cited by examiner

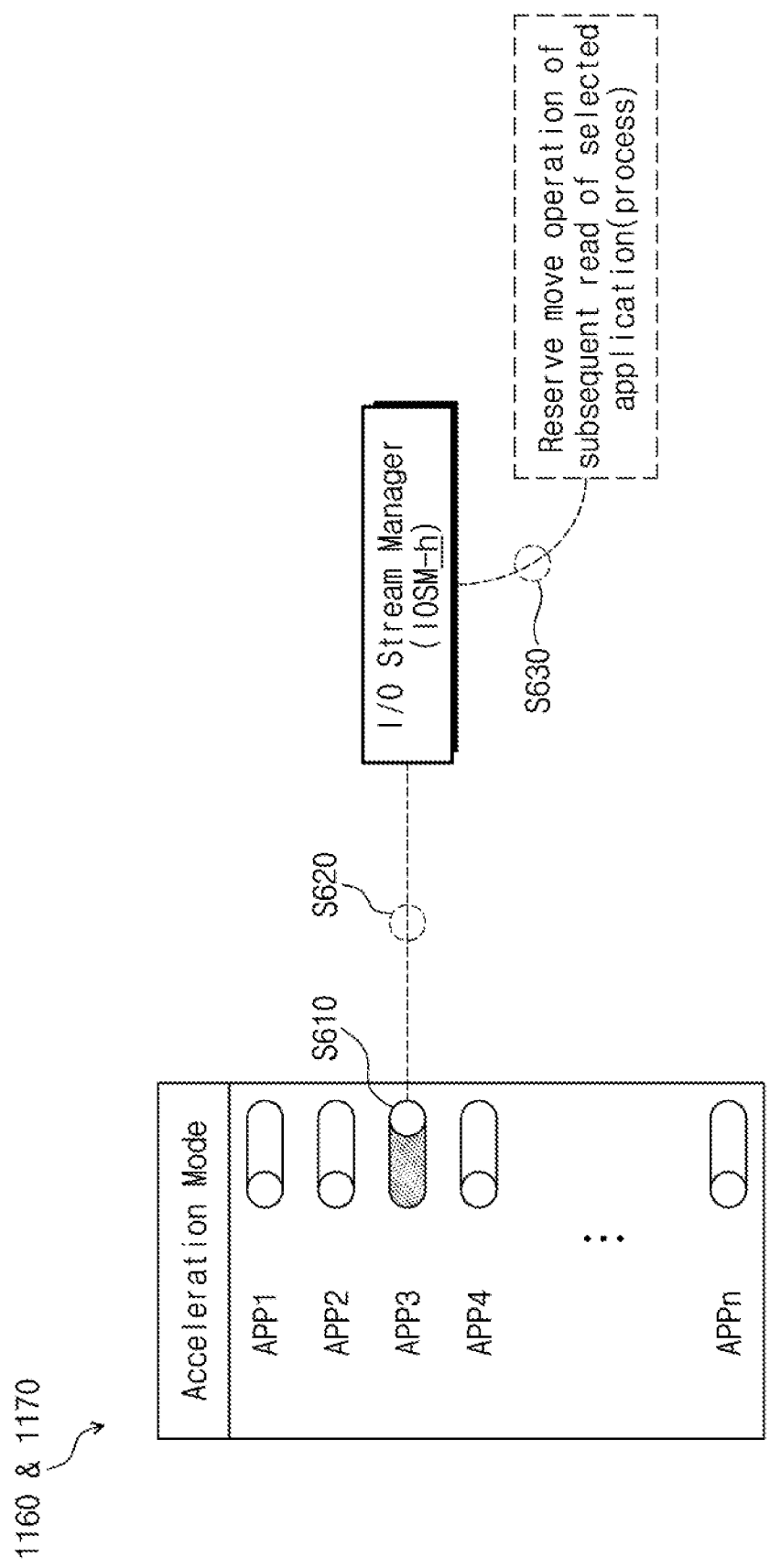

STORAGE DEVICE FOR ACCELERATING WRITE SPEED AND READ SPEED

CROSS-REFERENCE TO RELATED APPLICATIONS

This application claims priority under 35 U.S.C. § 119 to Korean Patent Application No. 10-2019-0094034 filed on Aug. 1, 2019, in the Korean Intellectual Property Office, the disclosures of which are incorporated by reference herein in their entireties.

BACKGROUND

Embodiments of the inventive concept disclosed herein relate to a semiconductor device, and more particularly, to a storage device accelerating a write speed and a read speed by using a buffer area.

Semiconductor memory devices are used in devices such as computers, tablets, cameras, and smartphones as volatile memory, where the volatile memory is used to store temporary data. Volatile memory devices transfer information very quickly, but the temporarily stored data is then removed when the device is powered off.

Alternatively, nonvolatile memory devices, such as phase-change RAM (PRAM), magnetic RAM (MRAM), resistive RAM (RRAM), ferroelectric RAM (FRAM), and flash memory, preserves data when the device is turned off. Nonvolatile memory devices often transfer information more slowly than a volatile memory device. However, flash memory allows for nonvolatile storage of data and fast operational speed. A universal flash storage (UFS) standard provides a flash storage specification. As technology progresses, the UFS standard is changed to improve memory performance.

When the UFS standard is updated, older technology may be required to adapt in order to meet the new specifications. Therefore, there is a need in the art for systems and methods that enable older UFS standard memory devices to communicate with the newest generation of UFS devices.

SUMMARY

Embodiments of the inventive concept provide a storage device for accelerating a write speed and a read speed.

According to an exemplary embodiment, a storage device includes a nonvolatile memory device including a first area, a second area, and a third area, and a controller that receives a write command and first data from an external host device, preferentially writes the first data in the first area or the second area rather than the third area when the first data are associated with a turbo write, and writes the first data in the first area, the second area, or the third area based on a normal write policy when the first data are associated with a normal write.

The controller receives a read command from the external host device, to read second data from the first area, the second area, or the third area based on the read command, and outputs the second data to the external host device. The controller also moves the second data in response to move information of the read command when the read command is received together with move information.

According to an exemplary embodiment, a storage device includes a nonvolatile memory device including a first area, a second area, and a third area, and a controller that receives a write command and first data from an external host device, preferentially writes the first data in the first area or the second area rather than the third area when the first data are associated with a turbo write, and writes the first data in the first area, the second area, or the third area based on a normal write policy when the first data are associated with a normal write. The controller receives a query request including a first group number and move information from the external host device and sets move attributes to data corresponding to the first group number based on the move information. The controller receives a read command including a logical address and a second group number following the query request, reads second data corresponding to the logical address from the first area, the second area, or the third area, outputs the second data to the external host device, and moves the second data based on the move attributes when the second group number is matched with the first group number.

According to an exemplary embodiment, a storage device includes a nonvolatile memory device including a first area, a second area, and a third area, and a controller that receives a read command from an external host device, reads data from the first area, the second area, or the third area based on the read command, outputs the data to the external host device, and moves the data to the first area, the second area, or the third area in response to the read command.

According to an exemplary embodiment, a method of data storage includes receiving a write command and first data; determining whether the write command corresponds to a normal write or a turbo write; selecting an area of a nonvolatile memory device based on the determination, wherein the selected area comprises a turbo write buffer when the write command corresponds to the turbo write and the selected area comprises the turbo write buffer or a user storage area when the write command corresponds to the normal write; and writing the first data to the selected are of the nonvolatile memory device base on the write command. In some cases, the method may include receiving a read command; reading second data from the nonvolatile memory based on the read command; determining whether the read command includes move information; and moving the second data based of the read command includes the move information.

BRIEF DESCRIPTION OF THE FIGURES

The above and other objects and features of the inventive concept will become apparent by describing in detail exemplary embodiments thereof with reference to the accompanying drawings.

FIG. 21 illustrates a conceptual diagram in which an embodiment of the inventive concept is applied to a storage system.

DETAILED DESCRIPTION

The present disclosure describes systems and methods that enable older universal flash storage (UFS) standard memory devices to communicate with newer generations of UFS devices. For example, a newer UFS standard may include a turbo write specification. According to a turbo write procedure, a portion of a storage space of a UFS device may be used as a multi-level cell (MLC) space (e.g., a triple-level cell (TLC) space), and the remaining portion may be used as a single-level cell (SLC) space. A host may identify a sum of a TLC capacity and an SLC capacity as the total capacity of the UFS device.

A UFS device may enable or disable the turbo write procedure based on a request of the host. When the turbo write procedure is enabled, the UFS device may accelerate write speed by preferentially writing data received from the host in the SLC space.

Additionally, the read speed of the SLC space may be higher than the read speed of the TLC space. Thus, the read speed of data stored in the SLC space of the UFS device may also be accelerated. Accordingly, the inventive concept is provided for a means for a host to request a turbo read process from a UFS device according to a newer UFS standard that includes a turbo write specification.

Below, embodiments of the inventive concept may be described in detail and clearly to such an extent that an ordinary one in the art easily implements the inventive concept.

Figure 1:
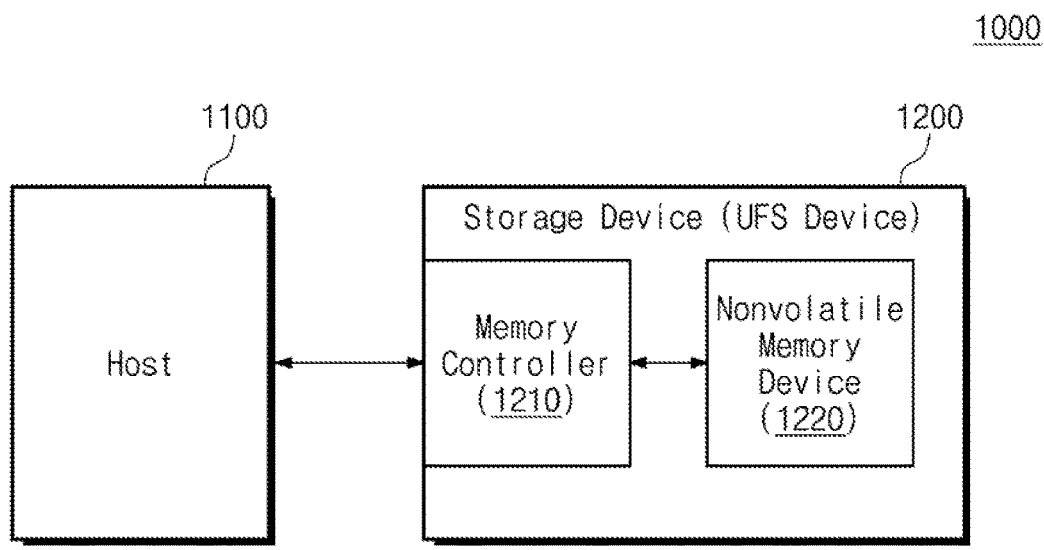
FIG. 1 is a block diagram illustrating a storage system according to an embodiment of the inventive concept.

FIG. 1 is a block diagram illustrating a storage system according to an embodiment of the inventive concept. Referring to FIG. 1, a storage system 1000 may include a host 1100 and a storage device 1200. In an exemplary embodiment, the storage system 1000 may include one of various computing systems such as a personal computer, a notebook, a tablet, a smartphone, and a wearable device.

The host 1100 may store data in the storage device 1200 or may read data stored in the storage device 1200. For example, the host 1100 may transfer a write command and write data to the storage device 1200 to store data in the storage device 1200. Alternatively, to read data stored in the storage device 1200, the host 1100 may transfer a read command to the storage device 1200 and may receive data from the storage device 1200.

The host 1100 may include a main processor such as a central processing unit (CPU) or an application processor (AP). Also, the host 1100 may include an auxiliary processor, which assists the main processor, such as a graphics processing unit (GPU) or a neural processing unit (NPU).

The storage device 1200 may operate under control of the host 1100. For example, the storage device 1200 may include a controller 1210 and a nonvolatile memory device 1220. The controller 1210 may operate in response to a command received from the host 1100. For example, the controller 1210 may receive a write command and write data from the host 1100. Additionally, the controller 1210 may store the receive write data in the nonvolatile memory device 1220 in response to the received write command.

Alternatively, the controller 1210 may receive a read command from the host 1100. Additionally, the controller 1210 may read data stored in the nonvolatile memory device 1220 in response to the received read command. The controller 1210 may then transfer the read data to the host 1100. In an exemplary embodiment, the nonvolatile memory device 1220 may be a NAND flash memory device, but the inventive concept is not limited thereto.

In an exemplary embodiment, the host 1100 may communicate with the storage device 1200 based on a universal flash storage (UFS) interface defined by the specific standards, such as the JEDEC standard. For example, the host 1100 and the storage device 1200 may exchange packets in the form of a UFS protocol information unit (UPIU). The UPIU may include various information defined by an interface (e.g., a UFS interface) between the host 1100 and the storage device 1200. However, the inventive concept is not limited thereto.

In an exemplary embodiment, the storage device 1200 may support a turbo write function. The turbo write function may be enabled or disabled under control of the host 1100. When the turbo write function is enabled under control of the host 1100, the storage device 1200 may perform a turbo write operation. The turbo write operation may be performed based on SLC write. Additionally, the turbo write operation may provide increased performance (e.g., increased write performance) of the storage device 1200. The turbo write operation will be more fully described with reference to the descriptions below.

Figure 2:
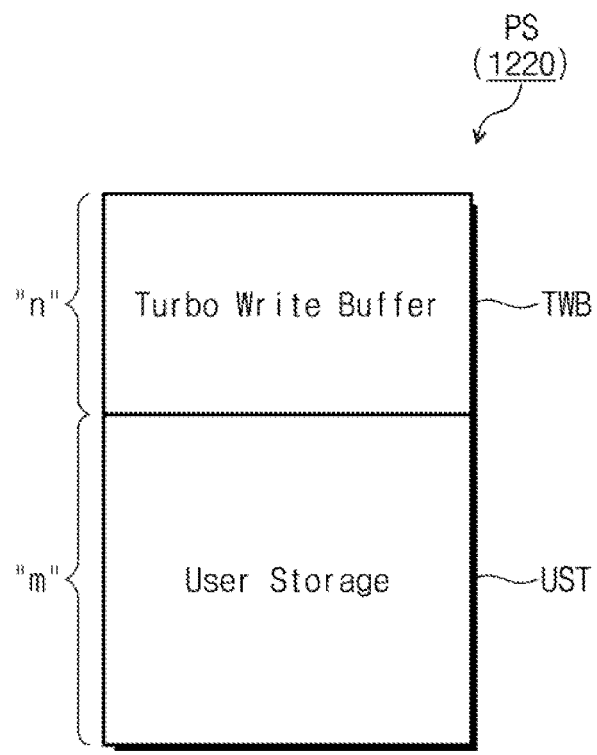
FIG. 2 is a diagram illustrating a physical storage space of a storage device of FIG. 1.

FIG. 2 is a diagram illustrating a physical storage space PS of the storage device 1200 of FIG. 1. The physical storage space PS of the storage device 1200 may indicate a physical area of the nonvolatile memory device 1220, in which user data is stored. For example, the physical storage space PS may be a space identified by the host 1100 as a capacity of the storage device 1200.

In an exemplary embodiment, the storage device 1200 may further include any other storage space (e.g., a space not identified by the host 1100 as a capacity of the storage device 1200, such as a reserved area, a meta area for storing meta data, or an overprovisioning area for improving performance), as well as the physical storage space PS illustrated in FIG. 2. However, for description brevity, additional description associated with the other storage space will be omitted (or minimized), and a description will be focused on the physical storage space PS where user data are stored.

Referring to FIGS. 1 and 2, the physical storage space PS of the storage device 1200 may include a turbo write buffer area (TWB) and a user storage area (UST). For description brevity, hereinafter the turbo write buffer area (TWB) will be referred to as a "turbo write buffer". Additionally, for description brevity, hereinafter the user storage area (UST) will be referred to as "user storage".

The turbo write buffer TWB may correspond to a portion (e.g., "a") of the physical storage space PS of the nonvolatile memory device 1220. The user storage UST may correspond to the remaining portion (e.g., "b") of the physical storage space PS of the nonvolatile memory device 1220 in the storage device 1200 or may correspond to the whole (e.g., a+b) of the physical storage space PS of the nonvolatile memory device 1220.

In an exemplary embodiment, each of memory cells corresponding to the turbo write buffer TWB may be used as a single-level cell (SLC). Additionally, each of memory cells corresponding to the user storage UST may be used as a multi-level cell (MLC) such as a triple-level cell (TLC).

Alternatively, each of the memory cells corresponding to the turbo write buffer TWB may be configured to store n-bit data (n being a positive integer). Additionally, each of the memory cells corresponding to the user storage UST may be configured to store m-bit data (m being a positive integer greater than n). For example, the turbo write buffer TWB may indicate an area supporting a higher write speed than the user storage UST.

For another example, "n" may be a positive integer greater than "m". For example, the number of bits that each memory cell of the turbo write buffer TWB stores may be more than the number of bits that each memory cell of the user storage UST stores. In the turbo write buffer TWB and the user storage UST, reliability and lifetime may influence the number of bits to be stored per memory cell.

In an exemplary embodiment, each of the reference signs "a" and "b" may mean the number of memory blocks in the corresponding storage space. Values of "a" and "b" may be variously changed based on sizes of the turbo write buffer TWB and the user storage UST and a scheme to implement the turbo write buffer TWB and the user storage UST (e.g., SLC, MLC, TLC, and QLC).

In an exemplary embodiment, as described with reference to FIG. 1, the storage device 1200, according to an embodiment of the inventive concept, may support a normal write function and a turbo write function. When the turbo write function is enabled by the host 1100, the storage device 1200 may perform the turbo write operation. When the turbo write function is disabled by the host 1100, the storage device 1200 may perform the normal write operation.

For example, in a case where the turbo write function is enabled, the storage device 1200 may first write the write data received from the host 1100 in the turbo write buffer TWB.

In this case, because write data received from the host 1100 are written in the turbo write buffer TWB (e.g., using a SLC program), a fast operating speed may be secured compared to a case where the normal write operation (e.g., using a TLC program) is performed on the user storage UST.

In a case where the turbo write function is disabled, the storage device 1200 may not first write the write data in the turbo write buffer TWB. Based on an internally given policy (e.g., a normal write policy), the storage device 1200 may directly write the write data in the user storage UST or may write the write data in the turbo write buffer TWB. The process of writing the write data may be determined based on various factors. Factors may depend on the normal write policy. For example, the data share of the turbo write buffer TWB and a status of the physical storage space PS, may be factors that influence writing the write data.

For another example, the normal write policy may be determined to first write the write data in the user storage UST. The normal write policy is assumed to be a policy in which write data is preferentially written in the user storage UST in the detailed description. The term "preferentially write" refers to a policy for writing data (e.g., to a first or second area) if an area is available for writing data, and if not, writing to a different area (e.g., a third area). However, the inventive concept is not limited thereto.

In an exemplary embodiment, data written in the turbo write buffer TWB may be flushed or migrated to the user storage UST based on an explicit command from the host 1100 or an internally given policy.

According to an exemplary embodiment, a method of data storage includes receiving a write command and first data from an external host device; determining whether the write command corresponds to a normal write or a turbo write; selecting an area of a nonvolatile memory device based on the determination, wherein the selected area comprises the turbo write buffer TWB when the write command corresponds to the turbo write and the selected area comprises the turbo write buffer TWB or a user storage area UST when the write command corresponds to the normal write; and writing the first data to the selected are of the nonvolatile memory device base on the write command.

In some cases, the method may include receiving a read command from the external host device; reading second data from the nonvolatile memory based on the read command; determining whether the read command includes move information; and moving the second data based of the read command includes the move information. For example, the move information may include information for moving the second data from the turbo write buffer TWB to the user storage area UST.

Figure 3A:
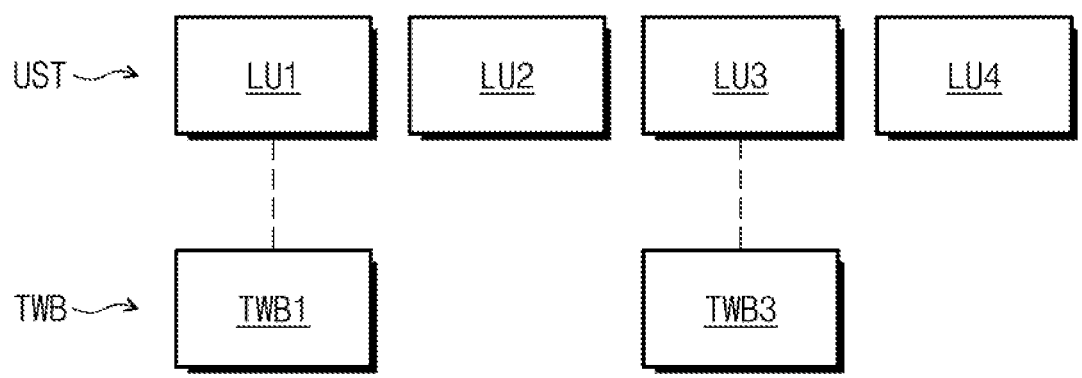
FIGS. 3A and 3B are diagrams for describing a turbo write buffer type of FIG. 2.
Figure 3B:
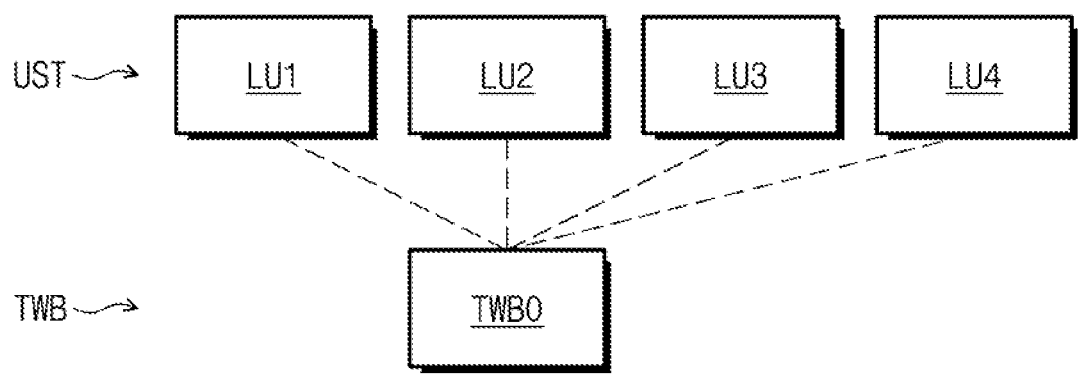

FIGS. 3A and 3B are diagrams for describing a turbo write buffer type of FIG. 2. Referring to FIGS. 1, 2, 3A, and 3B, the storage device 1200 may include first to fourth logical units LU1 to LU4. Each of the first to fourth logical units LU1 to LU4 may indicate a processing object that processes a command from the host 1100, is externally managed, and is independent. The host 1100 may manage the storage space of the storage device 1200 through the first to fourth logical units LU1 to LU4. Each of the first to fourth logical units LU1 to LU4 may be used to store data at the storage device 1200.

Each of the first to fourth logical units LU1 to LU4 may be associated with at least one memory block of the nonvolatile memory device 1220. Various kinds of logical units, used for various applications, may be present. However, the first to fourth logical units LU1 to LU4 are assumed to correspond to the physical storage space PS and are used to store data of the host 1100.

The first to fourth logical units LU1 to LU4 are illustrated in FIGS. 3A and 3B, but the inventive concept is not limited thereto. For example, the storage device 1200 may further include other logical units for storing and managing user data, as well as the first to fourth logical units LU1 to LU4. Alternatively, the storage device 1200 may further include other logical units for supporting various functions, as well as the first to fourth logical units LU1 to LU4.

The turbo write buffer TWB of the storage device 1200, according to an embodiment of the inventive concept, may be configured in various types. The turbo write buffer TWB may be configured in one of a logical unit (LU) dedicated buffer type and a shared buffer type.

In a case of the LU dedicated buffer type, the turbo write buffer TWB may be configured independently or individually for each logical unit LU. For example, as illustrated in FIG. 3A, in the LU dedicated buffer type, a first turbo write buffer TWB1 may be configured with respect to the first logical unit LU1 of the first to fourth logical units LU1 to LU4. Additionally, a third turbo write buffer TWB3 may be configured with respect to the third logical unit LU3 thereof.

In the LU dedicated buffer type, in a case where the write command for the first logical unit LU1 is received after the turbo write is enabled, the write data may be preferentially written in the first turbo write buffer TWB1 corresponding to the first logical unit LU1. In a case where the write command for the third logical unit LU3 is received after the turbo write function is enabled, the write data may be preferentially written in the third turbo write buffer TWB3 corresponding to the third logical unit LU3.

In a case where there are received the write commands for the second and fourth logical units LU2 and LU4 to which the turbo write buffers TWB are not allocated, the write data may be written in the user storage UST corresponding to the second and fourth logical units LU2 and LU4. Also, in a case where the write command for the first logical unit LU1 or the third logical unit LU3 is received after the turbo write is disabled, based on the normal write policy, the write data may be written in the user storage UST of the first logical unit LU1 or the first turbo write buffer TWB1 or may be written in the user storage UST of the third logical unit LU3 or the third turbo write buffer TWB3.

In an exemplary embodiment, capacities of the first and third turbo write buffers TWB1 and TWB3 may be set independently of each other. However, the inventive concept is not limited thereto. For example, the number of logical units to which turbo write buffers are respectively allocated, a capacity of each turbo write buffer, etc. may be variously changed or modified.

In an exemplary embodiment, a size of the turbo write buffer TWB for each logical unit may be set to a turbo write buffer size field per unit (e.g., "dLUNumTurboWriteBuffer-AllocUnits") of a unit descriptor. In an exemplary embodiment, the turbo write buffer size field per unit (e.g., "dLU-NumTurboWriteBufferAllocUnits") may be a configurable parameter.

In a case of the shared buffer type, one turbo write buffer may be configured with respect to the logical units. For example, as illustrated in FIG. 3B, in the shared buffer type, one turbo write buffer TWB0 may be configured to be shared by the first to fourth logical units LU1 to LU4.

In this case, when a write command for each of the first to fourth logical units LU1 to LU4 is received after the turbo write function is enabled, the write data may be preferentially written in the shared turbo write buffer TWB0. In a case where the write command for each of the first to fourth logical units LU1 to LU4 is received after the turbo write is disabled, the write data may be written in the user storage UST of each of the first to fourth logical units LU1 to LU4 or in the shared turbo write buffer TWB0.

As described above, according to an embodiment of the inventive concept, the storage device 1200 may include the turbo write buffer TWB for supporting the turbo write function. Depending on a buffer type (e.g., the LU dedicated buffer type or the shared buffer type), the turbo write buffer TWB may be configured with respect to each of a plurality of logical units. Alternatively, one turbo write buffer TWB may be configured with respect to the logical units.

Figure 4A:
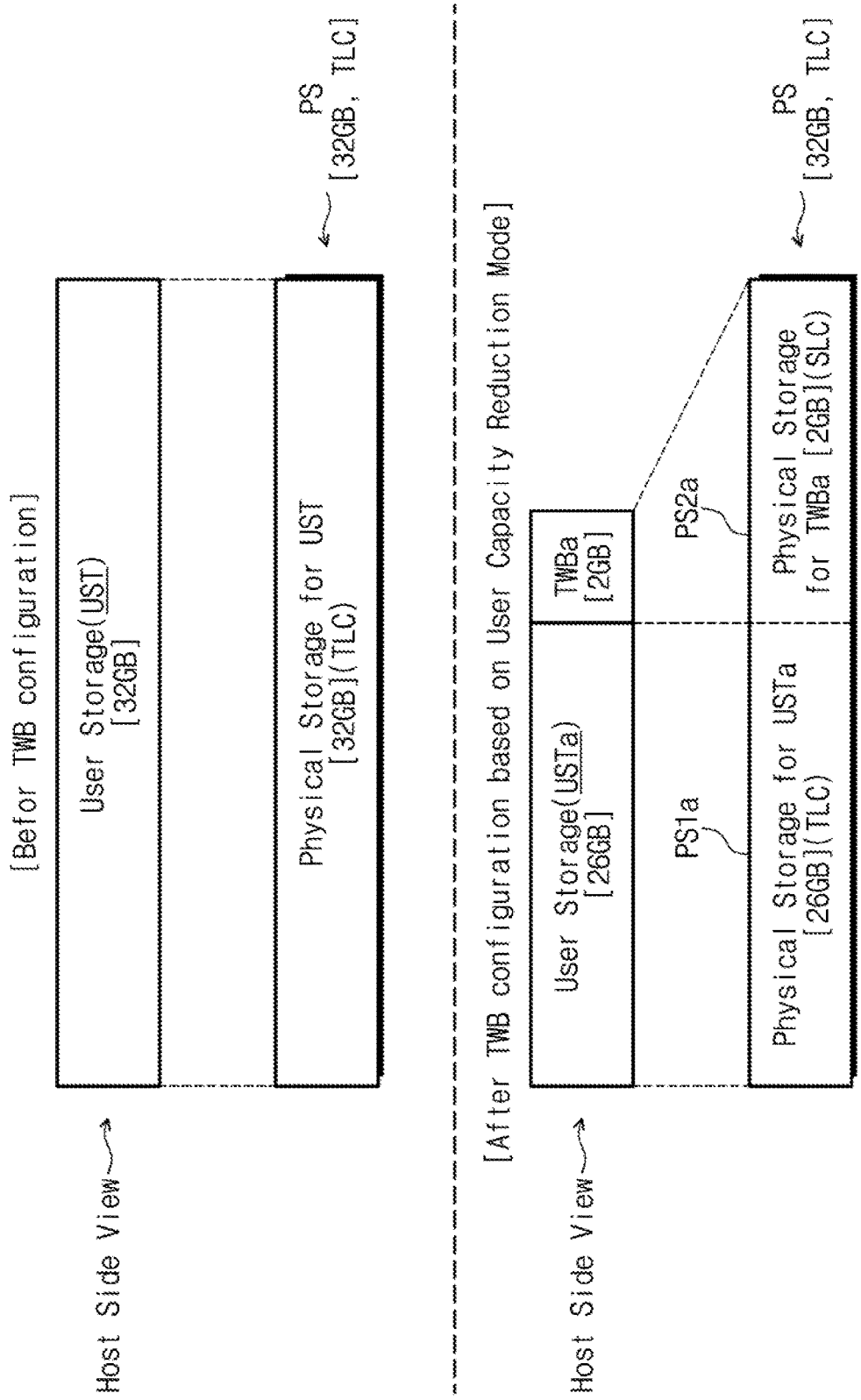
FIGS. 4A and 4B are diagrams for describing modes to configure a turbo write buffer of a storage device of FIG. 1.
Figure 4B:
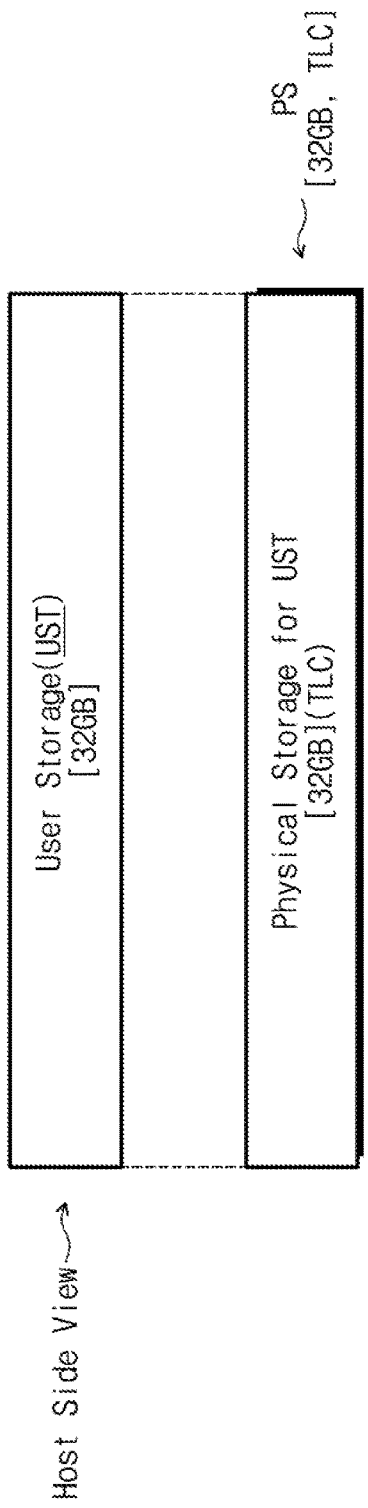
Figure 4B:
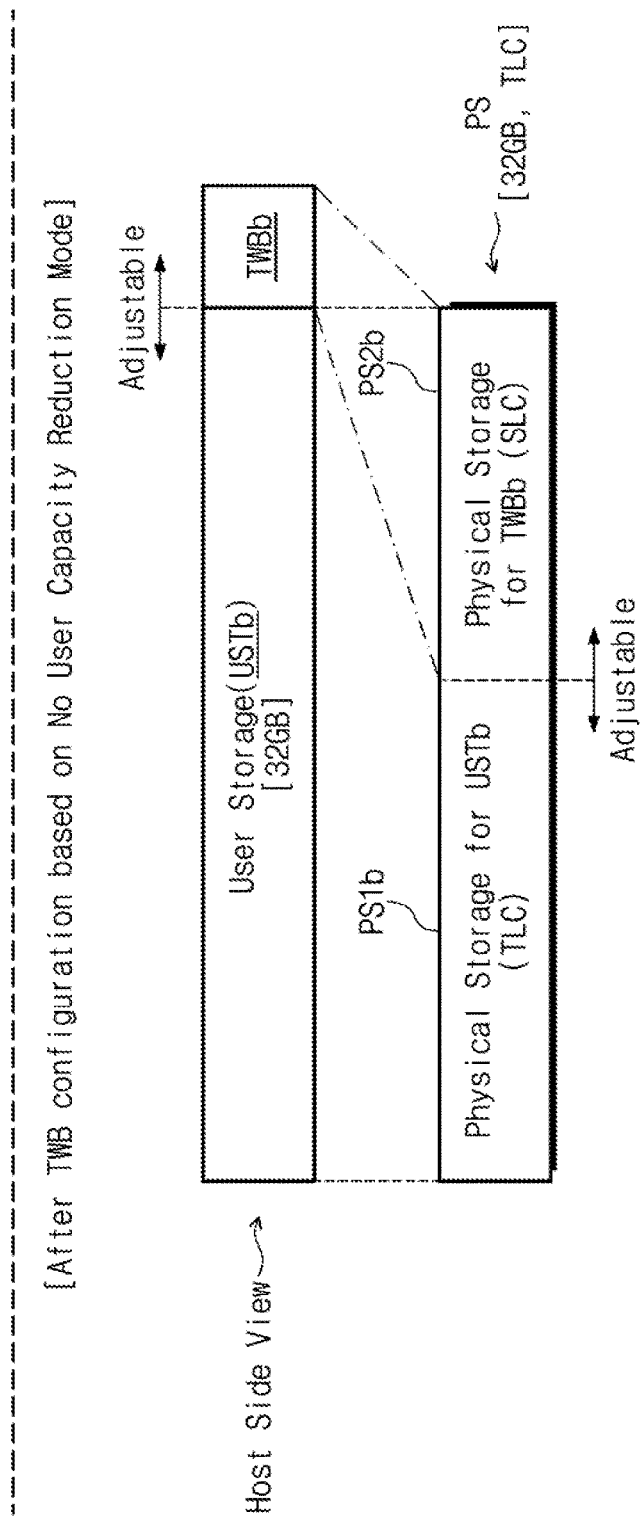

FIGS. 4A and 4B are diagrams for describing modes to configure a turbo write buffer of a storage device of FIG. 1.

For example, a turbo write buffer is integrally illustrated as one space regardless of buffer types (e.g., the LU dedicated buffer type and the shared buffer type).

Below, for description brevity, the physical storage space PS of the storage device 1200 is assumed to be 32 GB based on the TLC. For example, in a case where each of memory cells included in the storage device 1200 stores 3-bit data, the storage device 1200 may store user data of 32 GB.

However, the inventive concept is not limited thereto. For example, the physical storage space PS of the storage device 1200 may be variously changed based on a scheme to implement the storage device 1200 or the nonvolatile memory device 1220, for example, based on a memory cell type (e.g., SLC, MLC, TLC, or QLC), the number of memory cells, a memory cell structure, an overprovisioning ratio, etc.

Referring to FIGS. 1, 4A, and 4B, according to an embodiment of the inventive concept, the storage device 1200 may configure a physical storage space of the turbo write buffer TWB based on various modes. For example, the storage device 1200 may configure a physical storage space of a turbo write buffer based on one of a user capacity reduction mode and a no-user-capacity-reduction mode.

The user capacity reduction mode may indicate a mode to reduce a user capacity of user storage USTa to configure a turbo write buffer TWBa. For example, as illustrated in FIG. 4A, the physical storage space PS of the storage device 1200 may be 32 GB based on the TLC.

Before the turbo write buffer TWB is configured, the capacity of 32 GB (i.e., the whole capacity of the physical storage space PS) may be allocated to the user storage UST or may be used for the user storage UST. In this case, the user storage UST may be recognized to be the size of 32 GB from the perspective of the host 1100.

The turbo write buffer TWB configuration may depend on the user capacity reduction mode. In this case, a second physical storage space PS2a may be allocated to the turbo write buffer TWBa or may be used for the turbo write buffer TWBa. A second physical storage space PS2a may be a portion of the physical storage space PS.

Also, a first physical storage space PS1a being a portion of the physical storage space PS may be allocated to the user storage USTa or may be used for the user storage USTa. In this case, compared with a case where the turbo write buffer TWBa is not configured, the capacity of the user storage USTa may decrease (i.e., from 32 GB to 24 GB) from the perspective of the host 1100.

In an exemplary embodiment, the first physical storage space PS1a corresponding to the user storage USTa may be implemented with the TLC, and a second physical storage space PS2a corresponding to the turbo write buffer TWBa may be implemented with the SLC. A ratio of capacities when the same storage space is used as the TLC and is used as the SLC may be "3:1".

In other words, when the size of the turbo write buffer TWBa increases by 1 GB or less, a size of a logical storage space of the user storage USTa may decrease by as much as 3 GB. As described above, in a case where the turbo write buffer TWBa is configured in the user capacity reduction mode, a portion of the physical storage space PS of the storage device 1200 may be allocated for the turbo write buffer TWBa. Therefore, a capacity of the user storage USTa identified by the host 1100 may be decreased.

In an exemplary embodiment, the first physical storage space PS1a corresponding to the user storage USTa and the second physical storage space PS2a corresponding to the turbo write buffer TWBa may be physically adjacent to each other or may be physically spaced from each other.

The no-user-capacity-reduction-mode may indicate a mode in which a logical storage capacity of user storage USTb recognized by the host 1100 is not reduced even though a turbo write buffer TWBb is configured. For example, as illustrated in FIG. 4B, before the configuration of the turbo write buffer TWB, the user storage UST may have a capacity of 32 GB. For example, the physical storage space PS of the storage device 1200 may be allocated to the user storage UST or may be used for the user storage UST.

In a case where the turbo write buffer TWB is configured based on the no-user-capacity-reduction-mode, the turbo write buffer TWBb with a capacity (e.g., 2 GB) may be configured. A second physical storage space PS2b being a portion of the physical storage space PS may be allocated to the turbo write buffer TWBb or may be used for the turbo write buffer TWBb.

Unlike the user capacity reduction mode, the user storage USTb in the no-user-capacity-reduction-mode may maintain the capacity of 32 GB. For example, in the no-user-capacity-reduction-mode, the capacity of the user storage may be identical to the turbo write buffer TWBb before the configuration of the turbo write buffer TWBb. The capacity of the user storage UST may be identified from the perspective of the host 1100.

In an exemplary embodiment, in the no-user-capacity-reduction-mode, a size or configuration of the turbo write buffer TWBb may be variable based on an internal policy of the storage device 1200 or an explicit request from the host 1100. For example, a first physical storage space PS1b to be used for the user storage USTb may be smaller than a capacity of the user storage USTb when the second physical storage space PS2b being a portion of the physical storage space PS is used to configure the turbo write buffer TWBb.

For example, in a case where the whole of the first physical storage space PS1b is used to store user data or an available free capacity of the first physical storage space PS1b is equal to or smaller than a reference value, all or a portion of the second physical storage space PS2b used for the turbo write buffer TWBb may be returned to the user storage USTb.

In other words, in the physical storage space PS, in a case where maintaining the turbo write buffer TWBb, may be difficult, the second physical storage space PS2b allocated for the turbo write buffer TWBb may be returned to the user storage USTb. Maintaining the turbo write buffer TWBb may be difficult due to a lack of the available space for the user storage USTb. The above-described return operation may be performed, for example, through a user data flush operation and an operation of setting a turbo write buffer size.

In an exemplary embodiment, the host 1100 may check an available size of the turbo write buffer TWB of the storage device 1200. For example, the storage device 1200 may set information about a size of the turbo write buffer TWB at a turbo write buffer size field (e.g., "dCurrentTurboWriteBufferSize") of ATTRIBUTES and may set information about a ratio of an available capacity of the turbo write buffer TWB at an available turbo write buffer size field (e.g., "dAvailableTurboWriteBufferSize") thereof.

The host 1100 may check an available size of the turbo write buffer TWB by checking the turbo write buffer size field and the available turbo write buffer size field of the ATTRIBUTES. Based on the checked information, the host 1100 may use the turbo write or may return a physical storage space used for the turbo write buffer TWB to the user storage UST.

For another example, the storage device 1200 may automatically return a physical storage space used for the turbo write buffer TWB to the user storage UST. The host 1100 may check a changed status of the turbo write buffer TWB through the turbo write buffer size field.

In an exemplary embodiment, the storage device 1200 may provide information about a lifetime of the turbo write buffer TWB based on the number of P/E cycles of a physical storage space (or a memory block) allocated or used for the turbo write buffer TWB. For example, the storage device 1200 may set information about a lifetime of the turbo write buffer TWB at a turbo write buffer lifetime estimation field (e.g., "dTurboWriteBufferLifeTimeEst") of the ATTRIBUTES.

The host 1100 may estimate the lifetime of the turbo write buffer TWB by checking the turbo write buffer lifetime estimation field of the ATTRIBUTES of the storage device 1200 through a query request. In an exemplary embodiment, in the no-user-capacity-reduction-mode, because the user storage UST and the turbo write buffer TWB share the physical storage space PS, in a case where a write operation is performed on the user storage UST, the lifetime of the turbo write buffer TWB may decrease.

Figure 5:
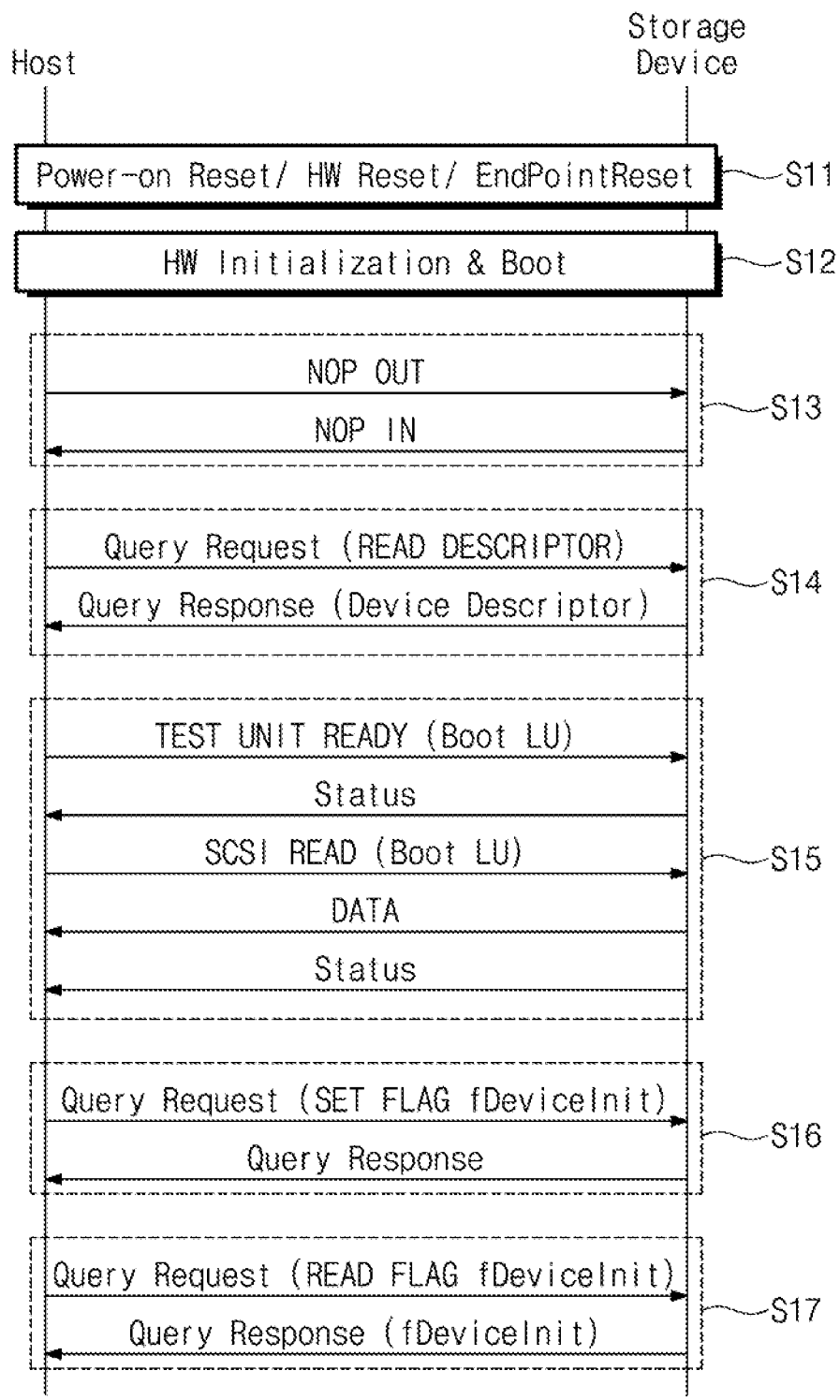
FIG. 5 is a flowchart illustrating an operation of a storage system of FIG. 1.

FIG. 5 is a flowchart illustrating an operation of the storage system 1000 of FIG. 1. An initialization operation of the storage system 1000 is described with reference to FIG. 5. Referring to FIGS. 1, 2, and 5, in operation S11, the host 1100 and the storage device 1200 may perform an operation such as a power-on reset operation, a hardware reset operation, or an endpoint reset operation.

Referring to operation S12, the host 1100 and the storage device 1200 may perform hardware reset and booting. For example, hardware layers of each of the host 1100 and the storage device 1200 may be initialized and booted.

Referring to operation S13, the host 1100 and the storage device 1200 may perform initialization on a layer (e.g., an UFS transport (UTP) layer). For example, the host 1100 may transfer the NOP OUT UPIU to the storage device 1200. The storage device 1200 may transfer the NOP IN UPIU to the host 1100 in response to the NOP OUT UPIU.

Referring to operation S14, the host 1100 may check a device descriptor from the storage device 1200. For example, the host 1100 may transfer a query request for reading a descriptor to the storage device 1200. The storage device 1200 may transfer the device descriptor to the host 1100 in response to the query request.

In an exemplary embodiment, the host 1100 may check a configuration and a function of the storage device 1200 through the device descriptor. For example, the device descriptor may include an extended UFS function support field (e.g., "dExtendedUFSFeaturesSupport") including information about whether to support the turbo write function. In an exemplary embodiment, the information about whether to support the turbo write function may be set to a bit (e.g., bit[8]) of the extended UFS function support field.

The device descriptor may further include a turbo-write-buffer-no-user-space-reduction-enable-field (e.g., "bTurboWriteBufferNoUserSpaceReductionEn") including information about a turbo write buffer mode. In a case where a value of the turbo-write-buffer-no-user-space-reduction-enable-field is "00h", the turbo write buffer TWB may be configured based on the user capacity reduction mode described with reference to FIG. 4A; in a case where a value of the turbo-write-buffer-no-user-space-reduction-enablefield is "01h", the turbo write buffer TWB may be configured based on the no-user-capacity-reduction-mode described with reference to FIG. 4B.

The device descriptor may further include a turbo write buffer type field (e.g., "bTurbowriteBufferType") including information about a turbo write buffer type. In a case where a value of the turbo write buffer type field is "00h", the turbo write buffer TWB may be configured based on the LU dedicated buffer type described with reference to FIG. 3A. In a case where a value of the turbo write buffer type field is "01h", the turbo write buffer TWB may be configured based on the shared buffer type described with reference to FIG. 3B.

The device descriptor may further include a shared turbo write buffer allocation number field (e.g., "dNumSharedTurboWriteBufferAllocUnits") including information about a size of a turbo write buffer. In a case where the number of units allocated to a shared turbo write buffer is set to "0", a turbo write buffer of the shared buffer type may not be configured.

The above-described fields are exemplary, and the inventive concept is not limited thereto. The device descriptor may further include other fields including information about a configuration, a structure, a function, etc. of the storage device 1200, as well as the above-described fields. Various fields of the device descriptor may indicate values that are set before the initialization operation. The host 1100 may identify a status of the storage device 1200 by reading various fields of the device descriptor.

In an exemplary embodiment, the above-described fields of the device descriptor, such as "bTurboWriteBufferNoUserSpaceReductionEn", "bTurboWriteBufferType", and "dNumSharedTurboWriteBufferAllocUnits", may be varied by writing a value of a corresponding field of a configuration descriptor. For example, the host 1100 may vary information such as a turbo write buffer type, turbo write buffer no user space reduction enable, and the number of units allocated to a turbo write buffer, by writing values of various fields of the configuration descriptor. In an exemplary embodiment, a geometry descriptor of the storage device 1200 may include information such as a turbo write buffer maximum size field, a turbo write buffer maximum number field, a turbo write buffer capacity adjustment factor field, a supported turbo write buffer no user capacity reduction type field, a supported turbo write buffer type field, etc.

For example, the turbo write buffer maximum size field (e.g., "dTurboWriteBufferMaxNAllocUnits") may include information about a maximum size of the turbo write buffer TWB supported at the storage device 1200. The turbo write buffer maximum number field (e.g., "bDeviceMaxTurboWriteLUs") may include information about the maximum number of turbo write buffers supported at the storage device 1200.

The turbo write buffer capacity adjustment factor field (e.g., "bTurboWriteBufferCapAdjFac") may include information about a capacity reduction factor according to a kind of turbo write buffer memory. For example, in a case where the turbo write buffer TWB is implemented with the SLC and the user storage UST is implemented with the TLC, a value of the turbo write buffer capacity adjustment factor field may be "3". In a case where the turbo write buffer TWB is implemented with the SLC and the user storage UST is implemented with the MLC, a value of the turbo write buffer capacity adjustment factor field may be "2".

The supported turbo write buffer no user capacity reduction type field (e.g., "bSupportedTurboWriteBufferNoUserSpaceReductionTypes") may include information about whether the storage device 1200 supports any turbo write buffer mode (e.g., the user capacity reduction mode, the no-user-capacity-reduction-mode, or both).

The supported turbo write buffer type field (e.g., "bSupportedTurboWriteBufferTypes") may include information about whether the storage device 1200 supports any turbo write buffer type (e.g., the LU dedicated buffer type, the shared buffer type, or both).

The above-described fields are exemplary, and the inventive concept is not limited thereto.

Referring to operation S15, the host 1100 may download a boot code from the storage device 1200. For example, the host 1100 may transfer the TEST UNIT READY UPIU to the storage device 1200. The storage device 1200 may transfer status information in response to the received TEST UNIT READY UPIU. The host 1100 may determine whether a boot logical unit (or a boot well-known LU) of the storage device 1200 is accessible, based on the received status information.

In a case where the boot logical unit is accessible, the host 1100 may transfer a SCSI READ command to the storage device 1200. In an exemplary embodiment, the SCSI READ command may correspond to the boot logical unit. The storage device 1200 may transfer data "DATA" and status information to the host 1100 in response to the received command.

Referring to operation S16, the host 1100 may complete the initialization operation by setting a FLAG of the storage device 1200. For example, the host 1100 may transfer the query request to the storage device 1200. The query request may be a request for setting a device initialization field (e.g., "fDeviceInit") included in the FLAG of the storage device 1200. In response to the query request, the device initialization field included in the FLAG of the storage device 1200 may be set to a value (e.g., "01h"). The storage device 1200 may then transfer a query response.

Referring to operation S17, the host 1100 may poll the device initialization field (e.g., "fDeviceInit") of the FLAG of the storage device 1200. For example, the host 1100 may transfer a query request for reading the device initialization field of the FLAG to the storage device 1200. Additionally, the storage device 1200 may transfer a query response, in which the device initialization field is included, to the host 1100.

In an exemplary embodiment, after operation S16, in a case where the initialization operation of the storage device 1200 is completed, the device initialization field may be reset to a different value (e.g., "00h"). For example, the host 1100 may repeatedly perform operation S17 to check whether the device initialization field is reset. In a case where the device initialization field is reset, the initialization operation of the host 1100 and the storage device 1200 may be completed.

Figure 6:
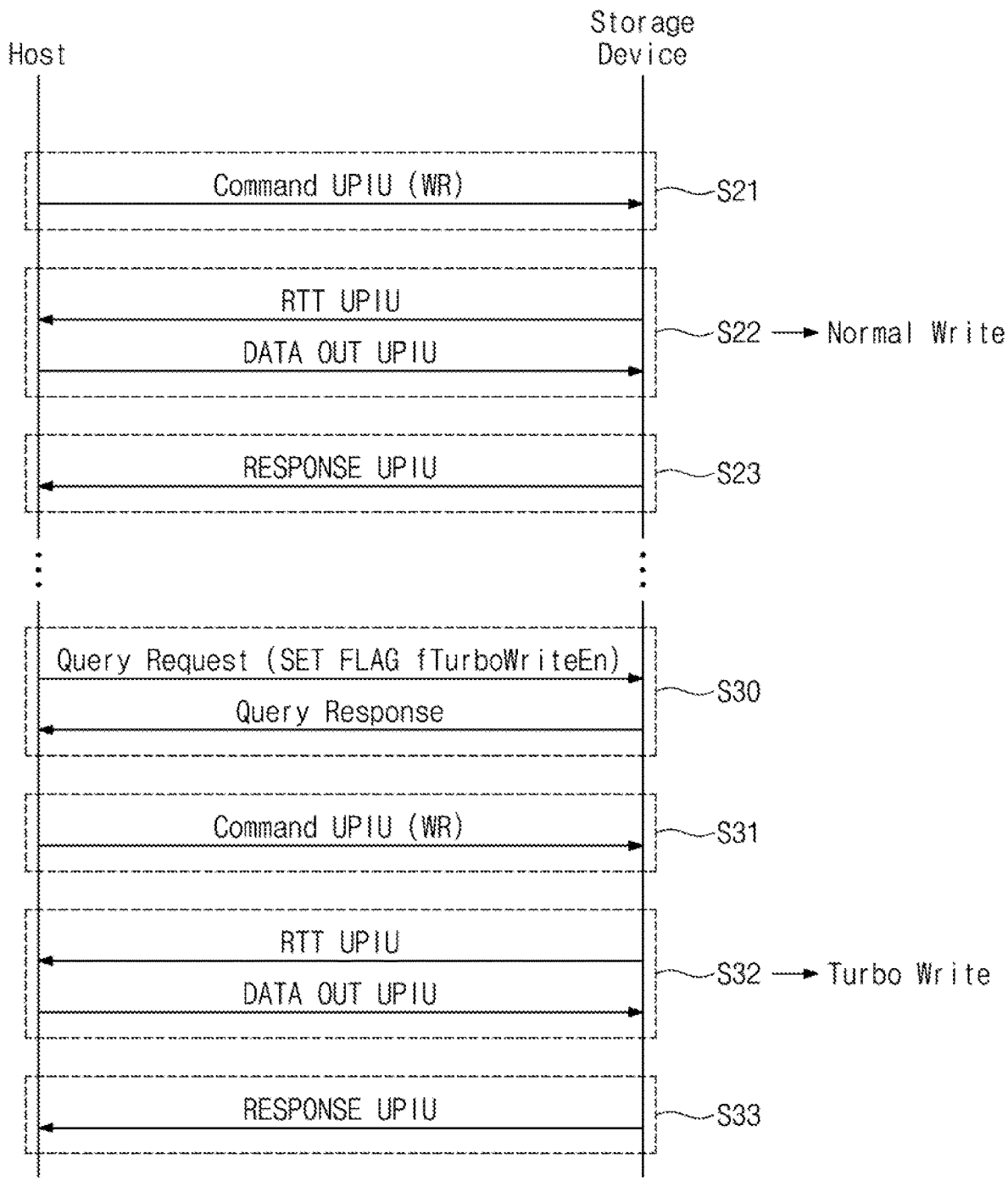
FIG. 6 is a flowchart illustrating an operation of a storage system of FIG. 1.

FIG. 6 is a flowchart illustrating an operation of a storage system of FIG. 1. A write operation of the storage system 1000 will be described with reference to FIG. 6. Referring to FIGS. 1 and 6, in operation S21, the host 1100 may transfer a command UPIU including write information WR (or a write command) to the storage device 1200.

Referring to operation S22, the host 1100 and the storage device 1200 may perform data transaction. For example, the storage device 1200 may transfer a ready to transfer UPIU (RTT UPIU) to the host 1100. The RTT UPIU may include information about a data range where the storage device 1200 is able to receive data. The host 1100 may transfer a DATA OUT UPIU including the write data to the storage device 1200 including the write data, in response to the RTT UPIU. As the above-described operation is performed, the write data may be transferred from the host 1100 to the storage device 1200.

After the whole write data are completely received, referring to operation S23, the storage device 1200 may transfer a RESPONSE UPIU to the host 1100. The RESPONSE UPIU may include information indicating that an operation corresponding to the write command received in operation S21 is completed.

In an exemplary embodiment, the storage device 1200 may perform a normal write operation on the write data received in operation S22. For example, referring to operation S21, the storage device 1200 may determine whether the turbo write function is enabled. In detail, the storage device 1200 may determine whether the turbo write function is enabled, based on a value of a turbo write enable field (e.g., "fTurboWriteEn") of the FLAG.

In a case where a value of the turbo write enable field is "0b", the turbo write function may be in a disabled. In a case where a value of the turbo write enable field is "1b", the turbo write function may be in an enabled. In an exemplary embodiment, a value of the turbo write enable field of the FLAG may be set by a query request for a set FLAG of the host 1100.

A value of the turbo write enable field may not be set by the host 1100. In this case, the write data received in operation S22 may be written in the turbo write buffer TWB or the user storage UST in compliance with the normal write policy.

Referring to operation S30, the host 1100 may set a value of the turbo write enable field to a value (e.g., "1b"). For example, the host 1100 may transfer a query request for setting a value of the turbo write enable field to a value (e.g., "1b") to the storage device 1200. A value of the turbo write enable field may be set to a value (e.g., "1b") in response to the query request from the host 1100, and the storage device 1200 may transfer a query response to the host 1100.

The host 1100 may then perform operation S31 to operation S33. Operation S31 to operation S33 may be similar to operation S21 to operation S23 except that the turbo write is performed based on the turbo write enable field, and thus, additional description will be omitted to avoid redundancy.

In an exemplary embodiment, the write data received in operation S32 may be written in the turbo write buffer TWB. For example, referring to operation S30, as a value of the turbo write enable field is set to a value (e.g., "1b"), the turbo write function may be enabled. In this case, the write data received from the host 1100 may be written in the turbo write buffer TWB.

In an exemplary embodiment, in a case where a space of the turbo write buffer TWB is insufficient, the storage device 1200 may write the received write data in the user storage UST when though the turbo write function is enabled.

Figure 7:
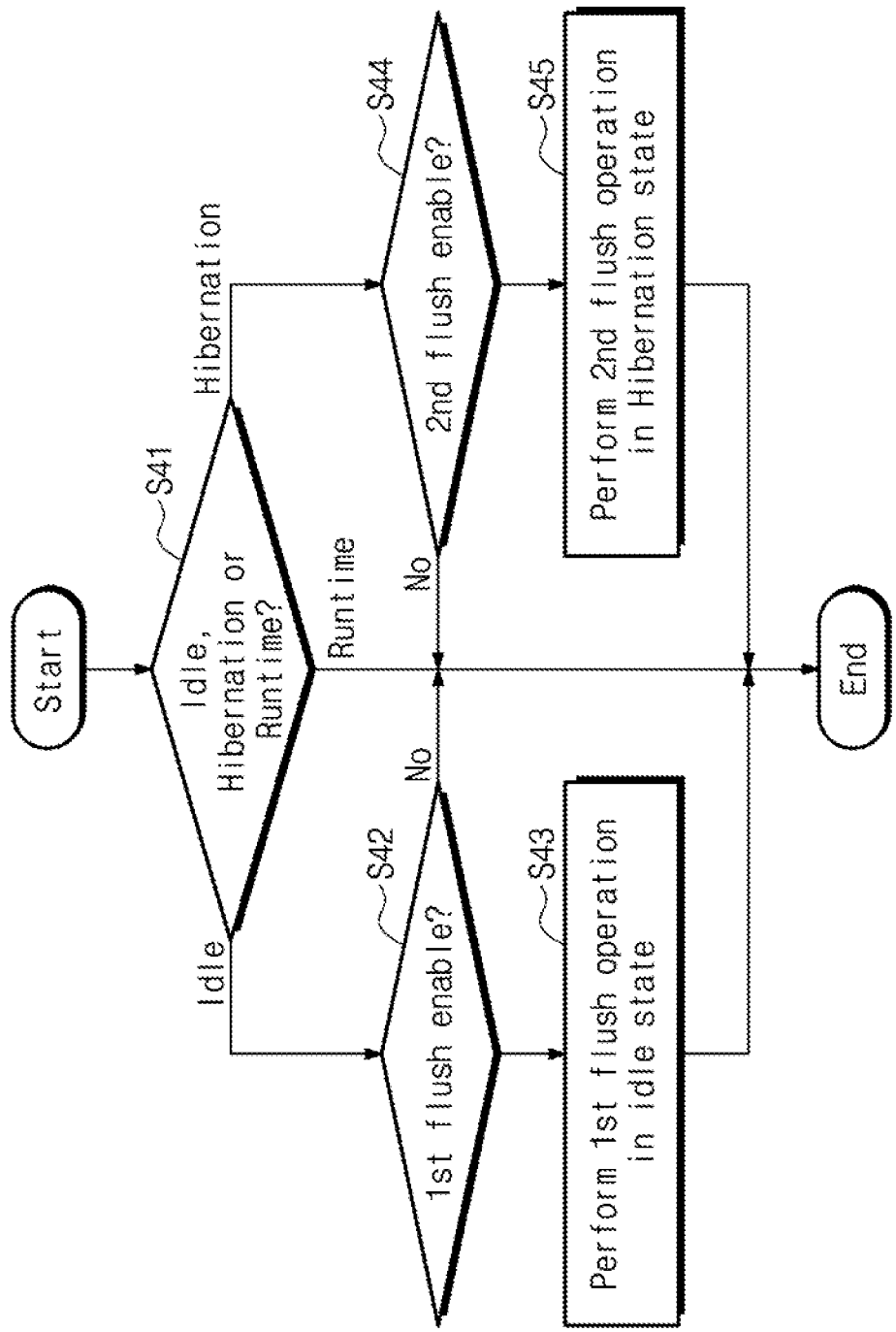
FIG. 7 is a flowchart illustrating an operation of a storage device of FIG. 1.

FIG. 7 is a flowchart illustrating an operation of the storage device 1200 of FIG. 1. A flush operation of the storage device 1200 will be described with reference to FIG. 7. Referring to FIGS. 1, 2, and 7, in operation S41, the storage device 1200 may determine whether a state is an idle state, a hibernation state, or a runtime state. When the storage device 1200 is in the runtime state, a separate flush operation may not be performed.

For example, when the storage device 1200 is processing a command received from the host 1100, the storage device 1200 may be in the runtime state. When a command (e.g., a pending command) that does not exist is received and processed (or to be processed) from the host 1100, the storage device 1200 may be determined to be in an idle state.

When the storage device 1200 enters a low-power mode called "hibernation" by the initiation of the storage device 1200 or the host 1100, the storage device 1200 may be determined to be in a hibernation state.

When the storage device 1200 is in the idle state, referring to operation S42, whether a first flush operation is enabled may be determined. The host 1100 may allow or prohibit the first flush operation at the storage device 1200 by setting a value of a turbo write buffer flush enable field (e.g., "fTurboWriteBufferFlushEn") of the FLAG of the storage device 1200. The storage device 1200 may determine whether the first flush operation is enabled, by checking a value of the turbo write buffer flush enable field of the FLAG.

In an exemplary embodiment, that a value of the turbo write buffer flush enable field of the FLAG is "0b" may indicate that the first flush operation is disabled or prohibited, and that a value of the turbo write buffer flush enable field of the FLAG is "1b" may indicate that the first flush operation is enabled. In a case where the first flush operation is disabled, the storage device 1200 may not perform a separate flush operation.

In a case where the first flush operation is enabled, referring to operation S43, the storage device 1200 may perform the first flush operation during the idle state. The first flush operation may indicate a flush operation that the storage device 1200 performs in the idle state. The flush operation may indicate an operation of flushing or migrating user data written in the turbo write buffer TWB to the user storage UST, based on the internal policy or the explicit command from the host 1100.

In an exemplary embodiment, when the user data written in the turbo write buffer TWB are flushed to the user storage UST, a logical address of the flushed user data may be maintained, and a physical address may be changed. In this case, the storage device 1200 may update mapping information of the logical address and the physical address of the flushed user data. For example, the physical address may be changed from an address of the turbo write buffer TWB to an address of the user storage UST.

Referring to operation S44, when a determination result of operation 41 indicates that the storage device 1200 is in the hibernation state, the storage device 1200 may determine whether a second flush operation is enabled. As in the above description, for example, the host 1100 may allow or prohibit the second flush operation at the storage device 1200 by setting a value of a turbo write buffer flush enable field during hibernation (e.g., "fTurboWriteBufferFlushDuringHibernat") of the FLAG.

The storage device 1200 may determine whether the second flush operation is enabled, by checking the value of the turbo write buffer flush enable field during hibernation of the FLAG. In an exemplary embodiment, that a value of the turbo write buffer flush enable field during hibernation of the FLAG is "0b" may indicate that the second flush operation is disabled or prohibited. That a value of the turbo write buffer flush enable field during hibernation of the FLAG is "1b" may indicate that the second flush operation is enabled. In a case where the second flush operation is disabled, the storage device 1200 may not perform a separate flush operation.

In a case where the first flush operation is enabled, referring to operation S45, the storage device 1200 may perform the second flush operation during the hibernation state. The second flush operation may indicate a flush operation that the storage device 1200 performs in the hibernation state.

According to the above flush operation, user data written in the turbo write buffer TWB may be flushed or migrated to the user storage UST. As such, an available buffer size of the turbo write buffer TWB may be secured.

In an exemplary embodiment, the above flush operation may be suspended under a condition. For example, the first flush operation performed in the idle state may be performed in a state where a command queue of the storage device 1200 is empty. In a case where a command is issued from the host 1100, the storage device 1200 may suspend the first flush operation from being performed while the first flush operation is performed. Additionally, the storage device 1200 may preferentially process the command issued from the host 1100. In an exemplary embodiment, in a case where the hibernation mode is terminated, the second flush operation performed in the hibernation state may be stopped.

As described above, a flush operation being performed may be suspended based on a condition. In this case, the storage device 1200 may set suspension information (or information of the progress degree) or a status of the flush operation to a turbo write buffer flush status field (e.g., "bTurboWriteBufferFlushStatus") of the ATTRIBUTES.

In an exemplary embodiment, the storage device 1200 may set information about that a flush operation for the turbo write buffer TWB is used to a value (e.g., bit[5]) of an exception event status (e.g., "dExceptionEventStatus") of the ATTRIBUTES. The host 1100 may check the value (e.g., bit[5]]) of the exception event status of the attributes, may determine that a flush operation is used at the storage device 1200, and may set fields (e.g., "fTurboWriteBufferFlushEn" and "fTurboWriteBufferFlushDuringHibernate") of the FLAG of the storage device 1200 in compliance with a policy.

Figure 8:
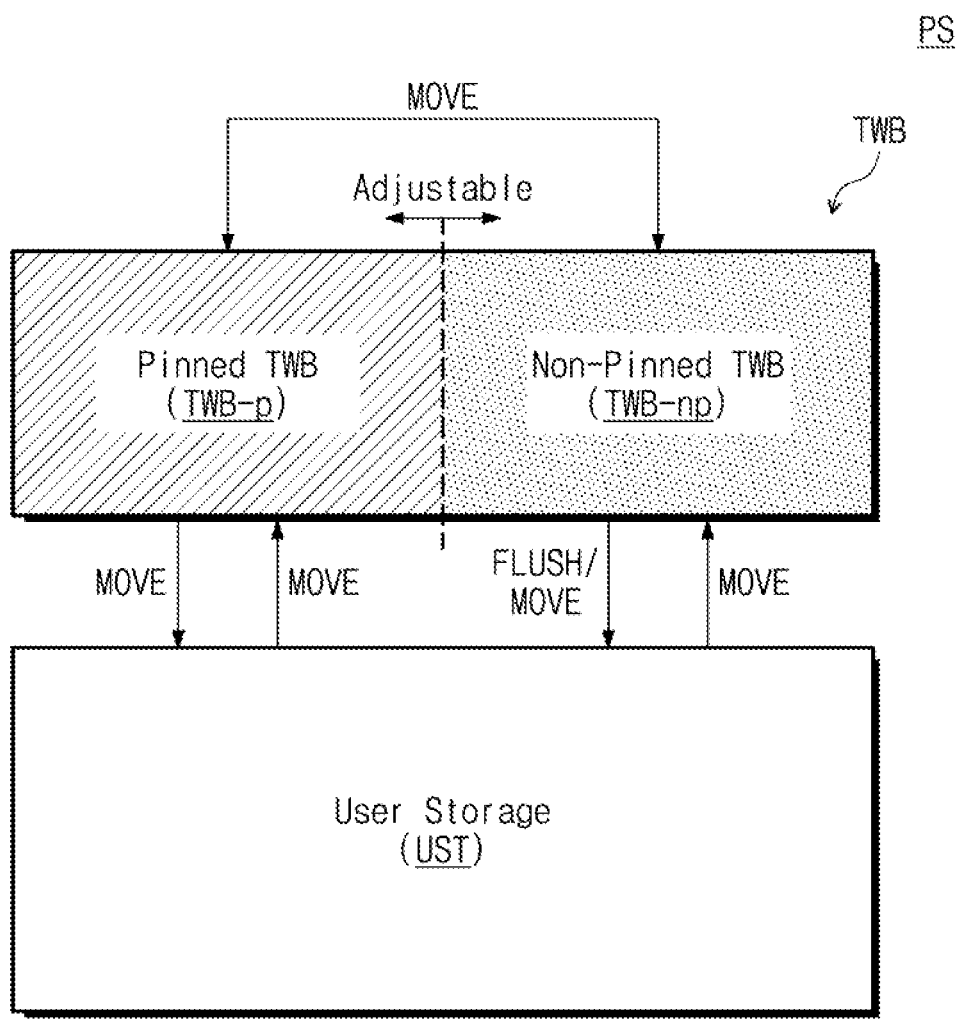
FIG. 8 is a block diagram illustrating a physical storage space of a storage device of FIG. 1.

FIG. 8 is a block diagram illustrating a physical storage space of the storage device 1200 of FIG. 1. Referring to FIGS. 1 and 8, the physical storage space PS of the storage device 1200 may include the turbo write buffer TWB and the user storage UST. The physical storage space PS, the turbo write buffer TWB, and the user storage UST of the storage device 1200 are described above, and thus, additional description will be omitted to avoid redundancy.

The turbo write buffer TWB may be divided into a pinned turbo write buffer TWB-p and a non-pinned turbo write buffer TWB-np. As in the above description, in a case where the turbo write function of the storage device 1200 is enabled, the write data may be stored in one of the pinned turbo write buffer TWB-p and the non-pinned turbo write buffer TWB-np.

Write data may be stored among the pinned turbo write buffer TWB-p and the non-pinned turbo write buffer TWB-np. Write data may be determined through various schemes (e.g., an internal policy, a change of the internal policy according to a request of a host, and an explicit request of a host).

In an exemplary embodiment, as described above, the size of the turbo write buffer TWB may be determined under control of the host 1100 or based on the internal policy of the storage device 1200. In this case, a ratio of the pinned turbo write buffer TWB-p and the non-pinned turbo write buffer TWB-np in the turbo write buffer TWB may be determined or varied through various schemes (e.g., an internal policy, a change of the internal policy according to a request of a host, and an explicit request of a host).

In an exemplary embodiment, user data may be flushed, migrated, or moved between the pinned turbo write buffer TWB-p, the non-pinned turbo write buffer TWB-np, and the user storage UST. For example, the user data may migrate or move between the pinned turbo write buffer TWB-p and the non-pinned turbo write buffer TWB-np based on an explicit request of the host 1100, an internal policy of the storage device 1200, or a change of the internal policy according to a request of the host 1100.

Alternatively, the user data may migrate or move between the non-pinned turbo write buffer TWB-np and the user storage UST based on the explicit request of the host 1100, the internal policy of the storage device 1200, or the change of the internal policy according to the request of the host 1100. Alternatively, the user data may migrate or move between the pinned turbo write buffer TWB-p and the user storage UST based on the explicit request of the host 1100, the internal policy of the storage device 1200, or the change of the internal policy according to the request of the host 1100.

In an exemplary embodiment, as described with reference to FIG. 7, the storage device 1200 may perform a flush operation during the idle state or the hibernation state. In this case, the storage device 1200 may perform the flush operation on the non-pinned turbo write buffer TWB-np of the turbo write buffer TWB. For example, the storage device 1200 may flush the user data stored in the non-pinned turbo write buffer TWB-np of the turbo write buffer TWB to the user storage UST.

In this case, the user data written in the pinned turbo write buffer TWB-p may not be flushed to the user storage UST. For example, even though the storage device 1200 performs the flush operation, the user data written in the pinned turbo write buffer TWB-p may be maintained.

For another example, based on the internal policy of the storage device 1200, data to be stored in the non-pinned turbo write buffer TWB-np may be written in the pinned turbo write buffer TWB-p. This exceptional data may be flushed from the pinned turbo write buffer TWB-p to the user storage UST.

Below, to make the inventive concept clear, a description will be given under the assumption that data to be stored in the pinned turbo write buffer TWB-p have to be stored in the pinned turbo write buffer TWB-p as a rule. For example, the inventive concept will be described except for the above example of exceptional data. However, it may be understood that the inventive concept includes examples of the above-described exceptional data.

Accordingly, in a case where the host 1100 issues a read command for first user data written in the pinned turbo write buffer TWB-p, the first user data may be read from the pinned turbo write buffer TWB-p. In this case, reading the first user data at a high speed may be possible.

For example, as described above, the pinned turbo write buffer TWB-p may store user data based on the SLC scheme, and the user storage UST may store user data in the TLC scheme. A time taken to read user data stored based on the SLC scheme is shorter than a time taken to read user data stored based on the TLC scheme.

For example, as user data is retained in the pinned turbo write buffer TWB-p, a speed at which the user data are read may be increased. This function of the storage device 1200 may be called "turbo read".

Figure 9:
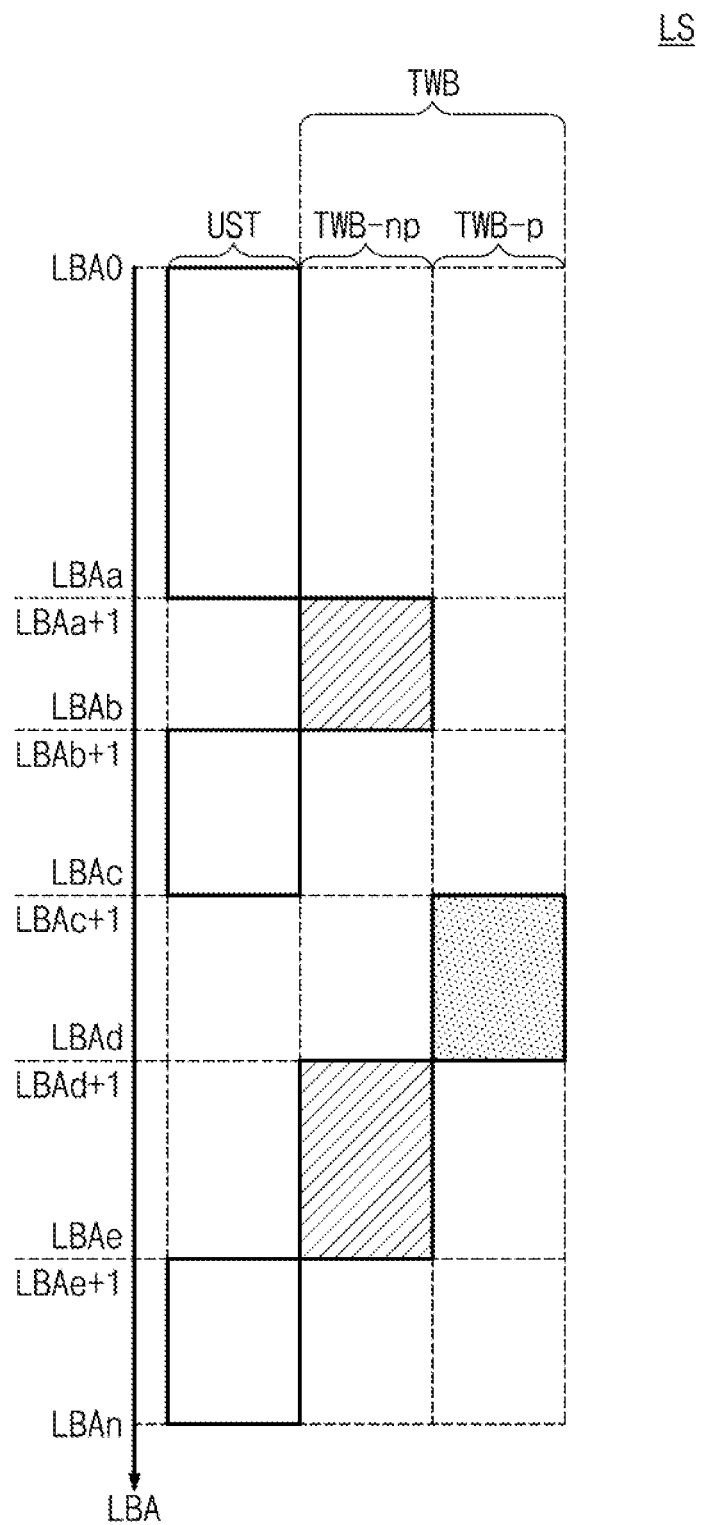
FIG. 9 is a diagram illustrating a logical storage space for a physical storage space of a storage device described with reference to FIG. 8.

FIG. 9 is a diagram illustrating a logical storage space for the physical storage space PS of the storage device 1200 described with reference to FIG. 8. For description brevity, the embodiment of FIG. 9 will be described with reference to one logical unit. However, the inventive concept may be applied to two or more logical units to which the turbo write buffer TWB are specified, or a relationship between logical units and a shared turbo write buffer (e.g., TWB0).

Referring to FIGS. 1 and 9, a logical storage space LS of the storage device 1200 identified by the host 1100 may include the user storage UST and the turbo write buffer TWB. The turbo write buffer TWB may include the pinned turbo write buffer TWB-p and the non-pinned turbo write buffer TWB-np.

A first logical address range (e.g., LBA0 to LBAa, LBAb+1 to LBAc, and LBAe+1 to LBAn) may correspond to a logical storage space of the user storage UST. In this case, user data stored in the first logical address range (e.g., LBA0 to LBAa, LBAb+1 to LBAc, and LBAe+1 to LBAn) may be stored in a physical storage space of the user storage UST.

A second logical address range (e.g., LBAa+1 to LBAb and LBAd+1 to LBAe) may correspond to a logical storage space of the non-pinned turbo write buffer TWB-np. In this case, user data stored in the second logical address range (e.g., LBAa+1 to LBAb and LBAd+1 to LBAe) may be stored in a physical storage space of the non-pinned turbo write buffer TWB-np.

A third logical address range (e.g., LBAc+1 to LBAd) may correspond to a logical storage space of the pinned turbo write buffer TWB-p. In this case, user data stored in the third logical address range (e.g., LBAc+1 to LBAd) may be stored in a physical storage space of the pinned turbo write buffer TWB-p.

As described above, the user storage UST, the non-pinned turbo write buffer TWB-np, and the pinned turbo write buffer TWB-p may be distributed in various forms on the logical storage space LS recognized by the host 1100. In an exemplary embodiment, user data may be moved, flushed, or migrated between the user storage UST, the non-pinned turbo write buffer TWB-np, and the pinned turbo write buffer TWB-p. The movement of the user data may depend on an explicit request of the host 1100 or the internal policy of the storage device 1200.

For example, the host 1100 may specify one of the pinned turbo write buffer TWB-p and the non-pinned turbo write buffer TWB-np in the turbo write. For another example, the host 1100 may specify one of the pinned turbo write buffer TWB-p and the non-pinned turbo write buffer TWB-np as a turbo write target before the turbo write. For another example, the host 1100 may not specify the pinned turbo write buffer TWB-p or the non-pinned turbo write buffer TWB-np in the turbo write.

The host 1100 may periodically check a distribution state of data changed by the storage device 1200 by requesting (e.g., using the Query UPIU) information of the pinned turbo write buffer TWB-p and the non-pinned turbo write buffer TWB-np from the storage device 1200. For example, a periodic check a distribution state of data changed by the storage device 1200 by requesting may be determined using a Query UPIU.

Figure 10A:
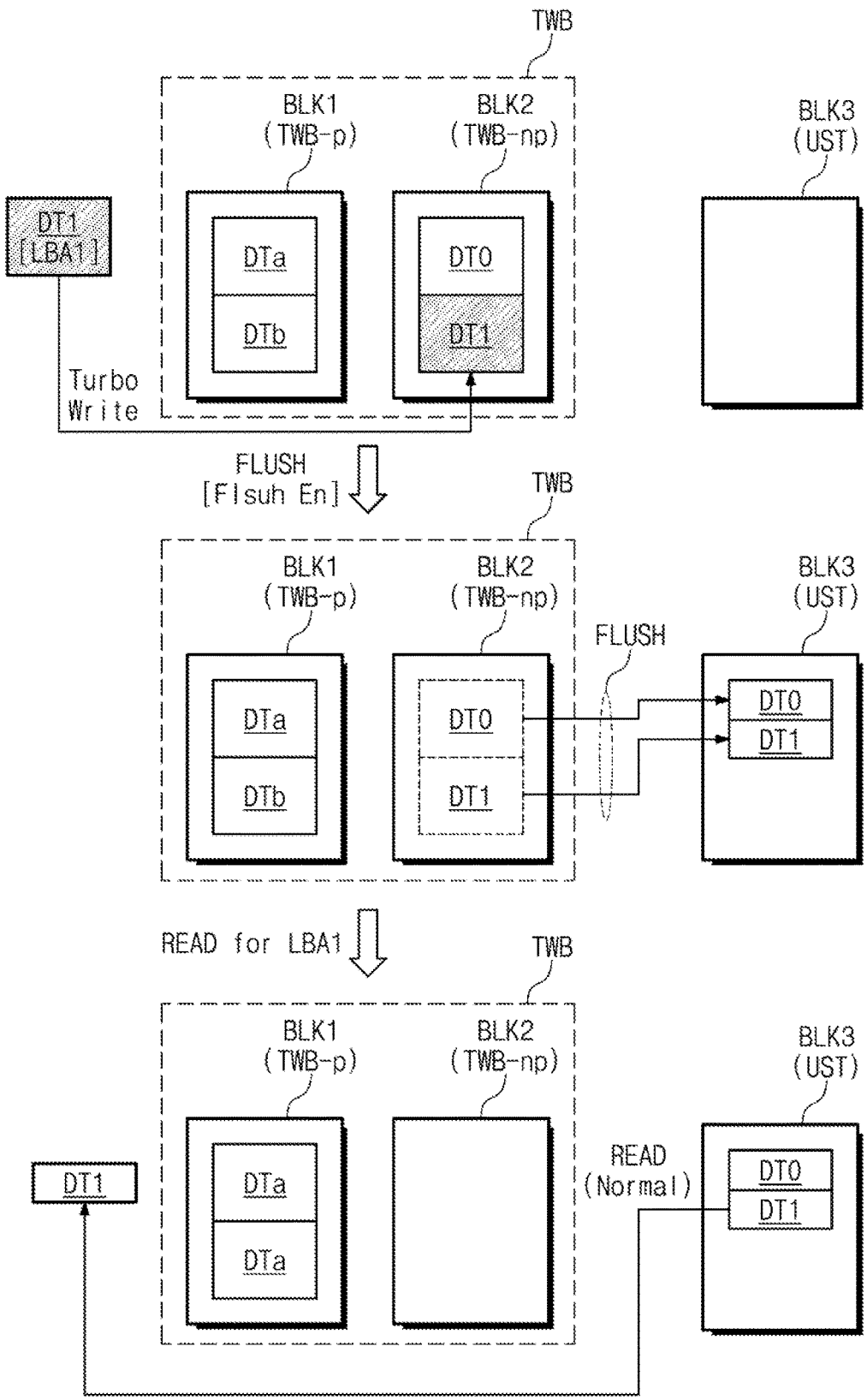
FIGS. 10A and 10B are diagrams illustrating an operation in a physical storage space of a storage device described with reference to FIG. 8.
Figure 10B:
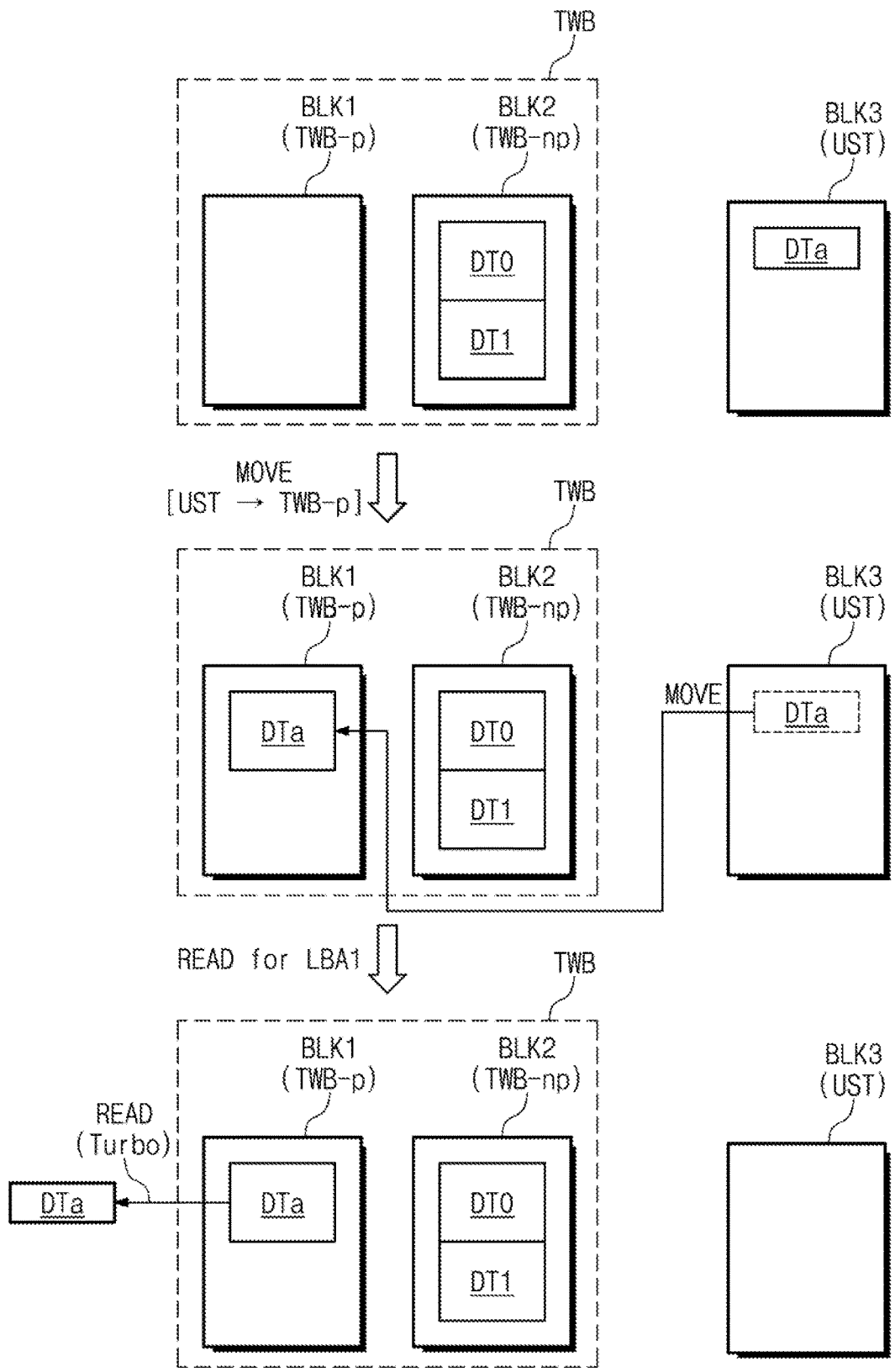

FIGS. 10A and 10B are diagrams illustrating an operation in a physical storage space of a storage device described with reference to FIG. 8. For brevity of illustration and description, the pinned turbo write buffer TWB-p is assumed to include a first memory block BLK1. Additionally, the non-pinned turbo write buffer TWB-np includes a second memory block BLK2, and the user storage UST may include a third memory block BLK3. However, the inventive concept is not limited thereto.

Referring to FIGS. 1, 8, and 10A, the storage device 1200 may receive first data DT1 corresponding to a first logical address LBA1 from the host 1100. In an exemplary embodiment, the turbo write function of the storage device 1200 may be in an enabled state. In this case, the storage device 1200 may write the received first data DT1 in the turbo write buffer TWB (e.g., the non-pinned turbo write buffer TWB-np).

For example, the storage device 1200 may perform the turbo write on the first data DT1. In an exemplary embodiment, in a case where the turbo write function is enabled, there may be a determination of whether to store data in any one of the pinned turbo write buffer TWB-p and the non-pinned turbo write buffer TWB-np.

In an exemplary embodiment, as illustrated in FIG. 10A, the pinned turbo write buffer TWB-p and the non-pinned turbo write buffer TWB-np may be full of data DTa, DTb, DT0, and DT1. In this case, the storage device 1200 may notify the host 1100 that a flush operation is used, by setting a bit (e.g., bit[5]) of an exception event status field (e.g., "wExceptionEventStatus") of the ATTRIBUTES.

The host 1100 may check the exception event status field of the ATTRIBUTES through a query request and may check that the flush operation is used at the storage device 1200. The host 1100 may allow the flush operation of the storage device 1200 by setting the turbo write buffer flush enable field or the turbo write buffer flush enable field during hibernation of the FLAG of the storage device 1200 as described with reference to FIG. 7.

When the flush function is allowed (or enabled) under control of the host 1100, the storage device 1200 may perform the flush operation. For example, in the idle state or the hibernation state, the storage device 1200 may flush the data DT0 and DT1 stored in the non-pinned turbo write buffer TWB-np to the third memory block BLK3 of the user storage UST. In an exemplary embodiment, the data DTa and DTb stored in the pinned turbo write buffer TWB-p may not be flushed to the user storage UST when the flush operation is allowed under control of the host 1100.

The storage device 1200 may then receive a read command for the first logical address LBA1 from the host 1100. In this case, the storage device 1200 may read the first data DT1 stored in the third memory block BLK3 of the user storage UST and may output the read first data DT1 to the host 1100.

In an exemplary embodiment, because the first data DT1 are written (i.e., SLC programmed) in the non-pinned turbo write buffer TWB-np but the first data DT1 are flushed to the user storage UST due to the flush operation, the first data DT1 may be read through a normal read operation (e.g., a TLC read operation).

Referring to FIGS. 1, 8, and 10B, the 0-th and first data DT0 and DT1 may be stored in the second memory block BLK2 of the non-pinned turbo write buffer TWB-np. The a-th data DTa may be stored in the third memory block BLK3 of the user storage UST.

The a-th data DTa of the user storage UST may then move to the first memory block BLK1 of the pinned turbo write buffer TWB-p, based on the explicit request of the host 1100 or the internal policy of the storage device 1200.

The storage device 1200 may then receive a read command for an a-th logical address LBAa corresponding to the a-th data DTa from the host 1100. In this case, the storage device 1200 may read the a-th data DTa stored in the first memory block BLK1 of the pinned turbo write buffer TWB-p and may transfer the read a-th data DTa to the host 1100.

In an exemplary embodiment, an operation of reading the a-th data DTa stored in the first memory block BLK1 of the pinned turbo write buffer TWB-p may be faster than an operation of reading data stored in the third memory block BLK3 of the user storage UST. For example, the storage device 1200 according to an embodiment of the inventive concept may support a fast read operation (i.e., a turbo read operation) with regard to data, by storing and retaining the data in the turbo write buffer TWB (or the pinned turbo write buffer TWB-p).

In an exemplary embodiment, the storage device 1200 may inform the host 1100 of the remaining (or free) capacity of the turbo write buffer TWB in response to a request of the host 1100. The storage device 1200 may write information about the remaining free capacity of the turbo write buffer TWB to an available turbo write buffer size field (e.g., "dAvailableTurboWriteBufferSize") of the ATTRIBUTES. The host 1100 may obtain capacity information of the turbo write buffer TWB by reading the available turbo write buffer size field (e.g., by using the Query UPIU).

For example, the storage device 1200 may separately record the remaining capacity of the pinned turbo write buffer TWB-p and the remaining capacity of the non-pinned turbo write buffer TWB-np at the available turbo write buffer size field. For another example, the storage device 1200 may record a total of the remaining capacity of the turbo write buffer TWB at the available turbo write buffer size field. Whether the storage device 1200 records the remaining capacity of the turbo write buffer TWB integrally or individually may be specified through FLAG setting of the host 1100.

For example, the storage device 1200 may record a smaller capacity than an actual free capacity of the turbo write buffer TWB at the available turbo write buffer size field. In the nonvolatile memory device 1220 such as a flash memory, in a case where a time between consecutive erase operations is smaller than a threshold time, the reliability of data may decrease.

Because the capacity of the turbo write buffer TWB is smaller than the capacity of the user storage UST and the turbo write buffer TWB is used in the SLC scheme, the turbo write buffer TWB may be filled with data more quickly than the user storage UST. Also, in a case where the host 1100 prefers the turbo write of a high speed, the turbo write buffer TWB may be full of data more quickly.

In a case where data are intensively written in the turbo write buffer TWB, a series of operations are performed. The operations may include a first erase operation is performed on the turbo write buffer TWB, data are written in the turbo write buffer TWB, and the data of the turbo write buffer TWB is flushed. Additionally, a second erase operation is performed on the turbo write buffer TWB, and data is written in the turbo write buffer TWB again.

In this case, when a time between the first erase operation and the second erase operation is smaller than the threshold time, the reliability of data that are written in the turbo write buffer TWB after the second erase operation may decrease. To solve this issue, even though a memory block of the turbo write buffer TWB does not store valid data and is reusable after an erase operation, when a time passing after an erase operation of the memory block is smaller than the threshold time, the storage device 1200 may record a capacity, from which a capacity of the memory block is excluded, at the available turbo write buffer size field.

Figure 11:
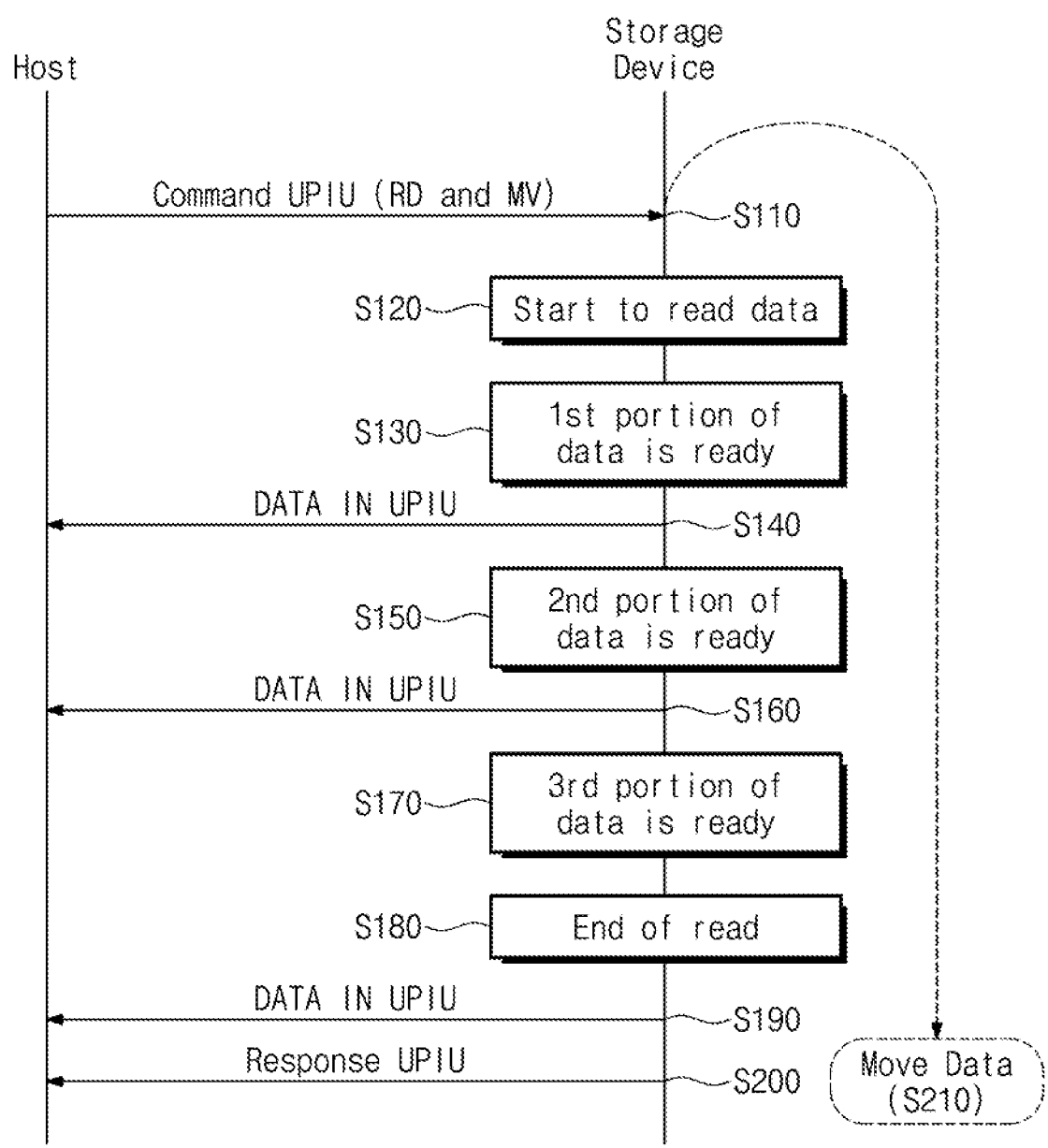
FIG. 11 illustrates an example of a read operation causing data movement, which is performed at a storage system.

FIG. 11 illustrates an example of a read operation causing data movement, which is performed at the storage system 1000. Referring to FIGS. 1, 8, and 11, in operation S110, the host 1100 may transfer the command UPIU to the storage device 1200. The command UPIU may include read information RD (or a read command) and move information MV.

The command UPIU may be defined as a read command by the read information RD. Additionally, the command UPIU may be defined as directing a move operation by the move information MV. Referring to operation S120, the controller 1210 of the storage device 1200 may start to read data from the nonvolatile memory device 1220 in response to the command UPIU.

For example, the read information may include a logical address. The nonvolatile memory device 1220 may start to read data from a storage space, which the logical address indicates, for example, the pinned turbo write buffer TWB-p, the non-pinned turbo write buffer TWB-np, or the user storage UST.

Referring to operation S130, a first portion of the data may be ready. For example, the first portion of the data may be completely read at the storage device 1200. Referring to operation S140, the storage device 1200 may then transfer the first portion of the data to the host 1100 through the DATA IN UPIU. While the storage device 1200 transfers the DATA IN UPIU, the data may be continuously read.

Referring to operation S150, a second portion of the data may be ready. For example, the second portion of the data may be completely read at the storage device 1200. Referring to operation S160, the storage device 1200 may then transfer the second portion of the data to the host 1100 through the DATA IN UPIU. While the storage device 1200 transfers the DATA IN UPIU, the data may be continuously read.

Referring to operation S170, a third portion of the data may be ready. For example, the third portion of the data may be completely read at the storage device 1200. As the third portion of the data is completely read, referring to operation S180, the storage device 1200 may complete the read operation of the data that the command UPIU requests.

Referring to operation S190, the storage device 1200 may then transfer the third portion of the data to the host 1100 through the DATA IN UPIU. Referring to operation S200, the storage device 1200 may complete the read operation by transferring a response UPIU informing a result of the read operation and a result of moving data to the host 1100.

Together with the operation where the storage device 1200 reads data in response to the read information RD and outputs the read data to the host 1100, the storage device 1200 may move the read data in response to the move information MV. For example, after starting to transfer the DATA IN UPIU in operation S190, in operation S210, the controller 1210 may move the data.

The controller 1210 may move the data to the pinned turbo write buffer TWB-p, the non-pinned turbo write buffer TWB-np, or the user storage UST. For example, the controller 1210 may write the data read in operation S120 to operation S180 to the pinned turbo write buffer TWB-p, the non-pinned turbo write buffer TWB-np, or the user storage UST and may invalidate original data. For example, in a case where a movement destination of the data is identical to an original location thereof, the controller 1210 may skip moving the data.

As described above, the turbo write buffer TWB may support a higher read speed than the user storage UST. By moving data to the turbo write buffer TWB through the move information MV, the storage device 1200 may support a function of accelerating a read speed of data.

As described above, the pinned turbo write buffer TWB-p may be free from the flush operation, and the non-pinned turbo write buffer TWB-np may be targeted for the flush operation. Accordingly, by moving data to the pinned turbo write buffer TWB-p or the non-pinned turbo write buffer TWB-np through the move information MV, the storage device 1200 may provide options to accelerate a read speed consistently or temporarily.

Also, by moving data to the user storage UST through the move information MV, the storage device 1200 may provide a function of moving cold data of a low read frequency to the user storage UST and securing a capacity of the turbo write buffer TWB. For example, by supporting the movement of data through the move information MV, the storage device 1200 may provide wide selectivity of data read to the host 1100.

For example, the storage device 1200 may record whether to support a move operation at a device descriptor. The storage device 1200 may notify the host 1100 whether the move operation is supported, by transferring the device descriptor to the host 1100. Whether the storage device 1200 performs the move operation may be set by the host 1100.

An example in which the command UPIU including the read information RD and the move information MV are processed is described with reference to FIG. 11. Unlike the example illustrated in FIG. 11, the command UPIU may include the read information RD without the move information MV. When the command UPIU includes the read information RD, the storage device 1200 may perform the read operation without the move operation.

For example, the storage device 1200 may perform the read operation when the command UPIU including the read information RD is received and may perform the read operation accompanying the move operation when the command UPIU including the read information RD and the move information MV is received.

Figure 12:
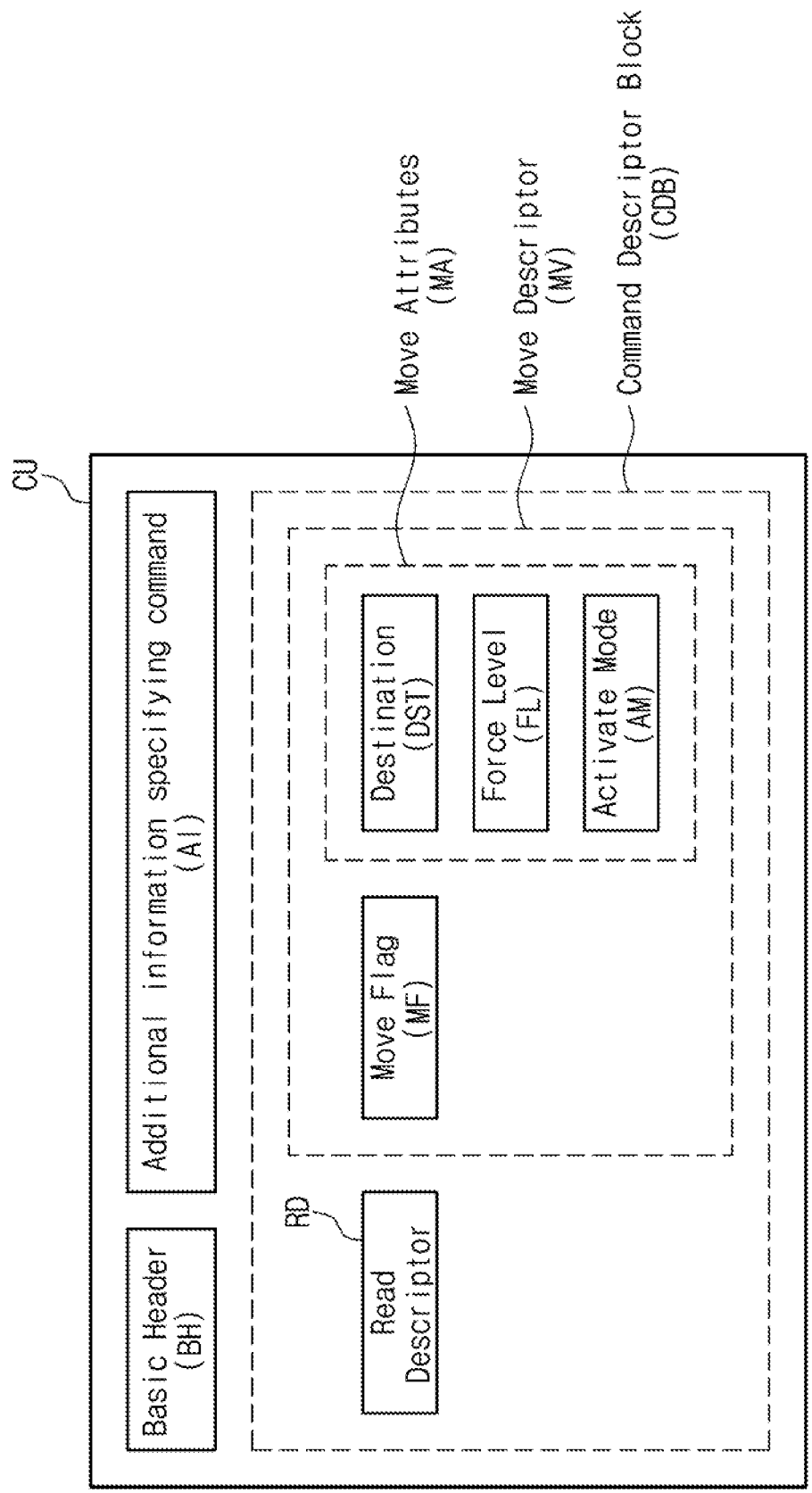
FIG. 12 illustrates an example of a command UPIU CU illustrated in FIG. 11.

FIG. 12 illustrates an example of a command UPIU CU illustrated in FIG. 11. Referring to FIG. 12, the command UPIU CU may include a basic header BH, additional information AI describing a command, and a command descriptor block CDB.

The basic header BH may include a transaction type (e.g., "xx000001b") defined by the UFS protocol, FLAGs, a logical unit number (LUN), a task tag, an initiator ID (IID), a command set type, a total EHS (Extra Header Segment) length, a data segment length (e.g., "00h"), an expected data transfer length (e.g., "0000h").

The additional information AI may include an expected data transfer length. The command descriptor block CDB may include a read descriptor as the read information RD and may include a move descriptor as the move information MV.

The read information RD may include a "READ (6)", "READ (10)", or "READ (16)" command defined by the UFS protocol. The READ (6) command may include an operation code (e.g., "08h"), a logical address, a transfer length, and a control (e.g., "00h").

The READ (10) command may include an operation code (e.g., "28h"), a read protect (RDPROTECT) (e.g., "000b"), a disable page out (DPO), a force unit access (FUA), FUA NV (e.g., "0b"), a logical address, a group number, a transfer length, and a control (e.g., "00h").

The READ (16) command may include an operation code (e.g., "88h"), the read protect (e.g., "000b"), a DPO, a FUA, FUA NV (e.g., "0b"), a logical address transfer length, a group number, and a control (e.g., "00h"). The READ (6), READ (10), or READ (16) command may be modified or changed based on the UFS protocol.

The move information MV may include a move flag MF and a move attributes MA when moving data. The move flag MF may indicate that a move of data has been used. The move attributes MA may describe schemes to move data.

For example, the move attributes MA may include at least one of destination information DST, force level information FL, and activate mode information AM.

The storage device 1200 may move data read by the read information RD, based on the move attributes MA. Each of the move attributes MA will be more fully detailed below. For example, whether to use each of the destination information DST, the force level information FL, and the activate mode information AM as the move attributes MA may be specified by the host 1100 through settings.

Also, the storage device 1200 may record whether to support each of the destination information DST, the force level information FL, and the activate mode information AM as the move attributes MA, at the device descriptor. The storage device 1200 may notify the host 1100 whether to support the respective move attributes MA, by transferring the device descriptor to the host 1100.

For example, as described with reference to FIG. 11, the storage device 1200 may support the command UPIU with the read information RD without the move information MV. In this case, the command UPIU may be provided in a state where the move information MV (shown as move descriptor MV) is removed from the command UPIU of FIG. 12.

Figure 13:
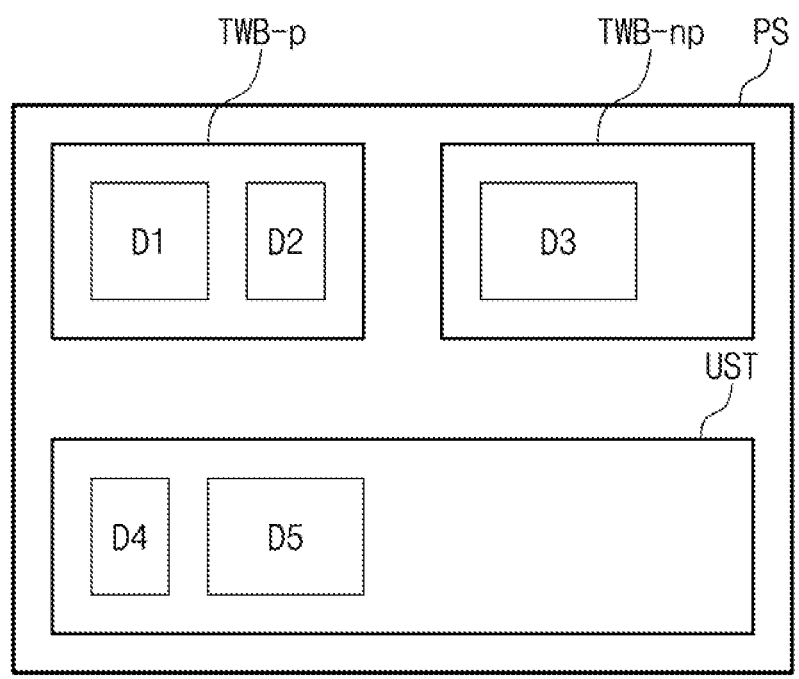
FIG. 13 illustrates an example of data stored in a pinned turbo write buffer, a non-pinned turbo write buffer, and user storage.

FIG. 13 illustrates an example of data stored in the pinned turbo write buffer TWB-p, the non-pinned turbo write buffer TWB-np, and the user storage UST. Referring to FIGS. 1, 12, and 13, the pinned turbo write buffer TWB of the physical storage space PS may store first data D1 and second data D2.

The non-pinned turbo write buffer TWB-np may store third data D3. The user storage UST may store fourth data D4 and fifth data D5. The destination information DST may indicate a destination area of one of the pinned turbo write buffer TWB-p, the non-pinned turbo write buffer TWB-np, and the user storage UST.

For example, the host 1100 may read the third data D3 from the non-pinned turbo write buffer TWB-np through the command UPIU CU including the read information RD. The command UPIU CU may further include the move information MV, and the destination information DST of the move information MV may indicate the pinned turbo write buffer TWB-p as a destination area. In response to the move information MV included in the command UPIU CU, the storage device 1200 may move the third data D3 to the pinned turbo write buffer TWB-p.

Depending on the instructions of the move information MV, the storage device 1200 may move data from the pinned turbo write buffer TWB-p to the non-pinned turbo write buffer TWB-np, from the pinned turbo write buffer TWB-p to the user storage UST, from the non-pinned turbo write buffer TWB-np to the pinned turbo write buffer TWB-p, from the non-pinned turbo write buffer TWB-np to the user storage UST, from the user storage UST to the pinned turbo write buffer TWB-p, or from the user storage UST to the non-pinned turbo write buffer TWB-np.

As the data are moved, the storage device 1200 may map a logical address of the move target data onto a physical address of the moved destination area. By maintaining the logical address of the move target data, the storage device 1200 may move data internally and may support the access using the same logical address to the host 1100. Accordingly, this data movement may not cause an additional load of the host 1100.

For example, the destination information DST may be provided by using not a logical address but information of an area (e.g., the pinned turbo write buffer TWB-p, the non-pinned turbo write buffer TWB-np, or the user storage UST).

The storage device 1200 may reduce the load of the host 1100 by moving data internally based on the information of the destination area.

The storage device 1200 may inform the host 1100 whether data belongs to any area, based on a request (e.g., a query request) of the host 1100. For example, the storage device 1200 may automatically move data such that the load of the host 1100 decreases. Additionally, the storage device 1200 may allow the host 1100 to track a location of the data.

Figure 14:
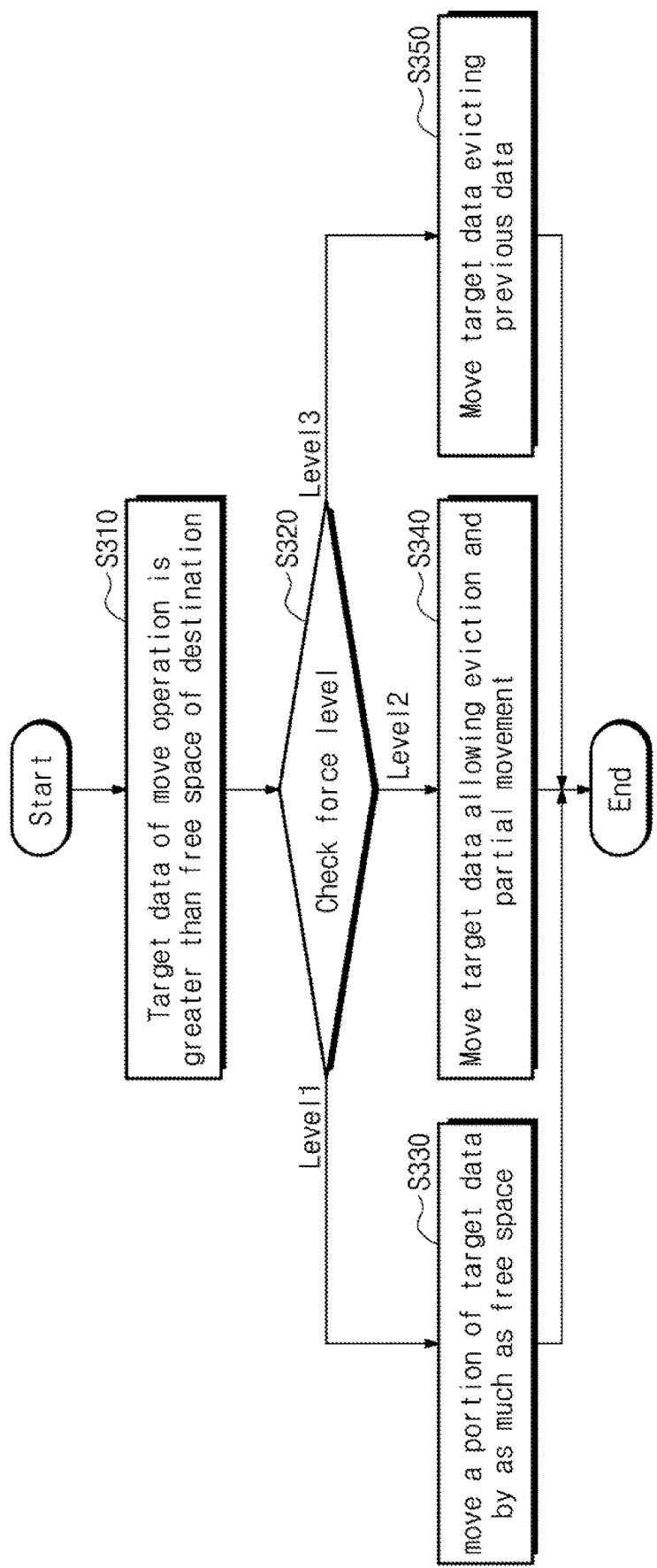
FIG. 14 illustrates an example in which a storage device moves data based on force level information.

FIG. 14 illustrates an example in which the storage device 1200 moves data based on the force level information FL. Referring to FIGS. 1, 12, and 14, in operation S310, target data of a move operation, (e.g., data read in response to the read information RD of the command UPIU) may be greater than a free space (or capacity) of a destination area. In this case, referring to operation S320, the storage device 1200 may check the force level information FL of the move attributes MA.

When a force level is a first level, operation S330 is performed. Referring to operation S330, the storage device 1200 may move a portion of data as much as the free capacity of the destination area. The storage device 1200 may be prohibited from evicting data that may be stored in the destination area.

When the force level is a second level, operation S340 is performed. Referring to operation S340, the storage device 1200 may be allowed to evict the data stored in the destination area and may be allowed to move a portion of the data being the move target and to leave the remaining portion at an original location.

For example, a quantity or ratio of data to be evicted, the quantity or ratio of move target data to be moved, and the quantity or ratio of move target data to be left may be determined in compliance with the force level policy. For example, the force level information FL may further include information of the force level policy. For another example, the force level policy may be set or changed by a request (e.g., a query request) of the host 1100.

When the force level is a third level, operation S350 is performed. Referring to operation S350, the storage device 1200 may evict the data of the target area and may move the move target data to the destination area.

As described above, based on the force level information FL, the storage device 1200 may move a portion of the move target data and may maintain the remaining portion at an original location. The storage device 1200 may map a logical address of the partial data thus moved onto a physical address of the destination area.

The storage device 1200 may invalidate the partial data, which are moved to the destination area, of the move target data. The storage device 1200 may maintain, as valid data, the remaining partial data, which are not moved and are left at the original location, of the move target data and may maintain mapping between a logical address and a physical address of the remaining partial data.

As described above, based on the force level information FL, the storage device 1200 evicts the data stored in the destination area. The evicted data may be moved to the user storage UST or the non-pinned turbo write buffer TWB-np, based on default settings. For another example, a location to which the data are to be evicted may be included in the force level information FL based on the force level policy.

For example, the movement according to the force level information FL of FIG. 14 may be applied when the destination area is the pinned turbo write buffer TWB-p or the non-pinned turbo write buffer TWB-np. For example, when free space of the user storage UST is insufficient, a command may be denied at the host 1100 or at the storage device 1200.

Figure 15:
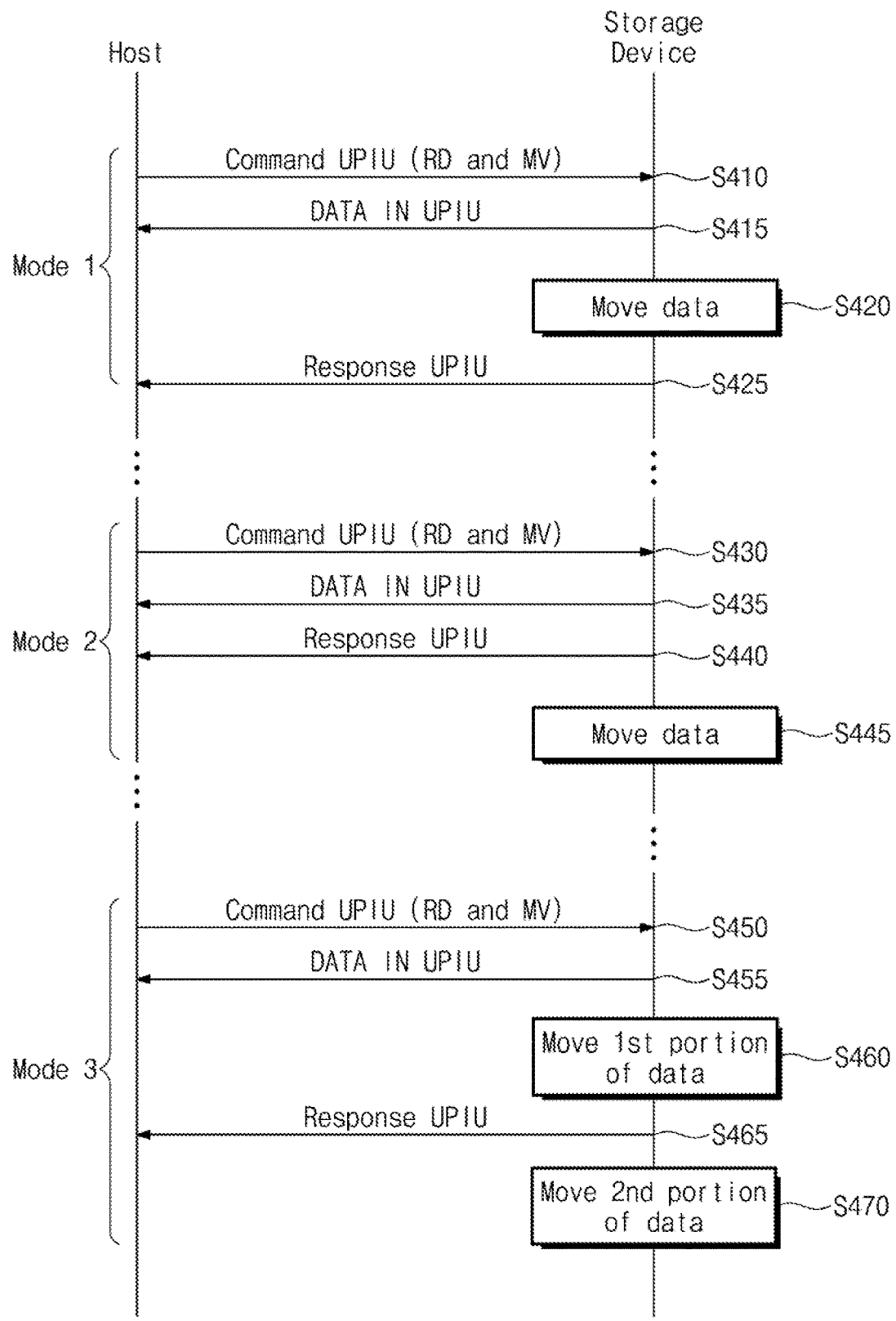
FIG. 15 illustrates examples in which a storage device moves data based on activate mode information.

FIG. 15 illustrates examples in which the storage device 1200 moves data based on activate mode information AM. Referring to FIGS. 1, 12, and 15, the activate mode information AM may indicate a time at which the storage device 1200 moves data.

When the activate mode information AM indicates a first mode, the storage device 1200 may perform operation S410 to operation S425. Referring to operation S410, the storage device 1200 may receive the command UPIU including the read information RD and the move information MV from the host 1100.

Referring to operation S415, the storage device 1200 may transfer the read data to the host 1100 through the DATA IN UPIU in response to the read information RD of the command UPIU. Referring to operation S420, the storage device 1200 may move data in response to the move information MV of the command UPIU. Referring to operation S425, the storage device 1200 may transfer the response UPIU to the command UPIU.

For example, when the activate mode information AM indicates the first mode, the storage device 1200 may move data before transferring the response UPIU to the host 1100. Alternatively, when the activate mode information AM indicates the first mode, the storage device 1200 may start to move data before transferring the response UPIU to the host 1100. The storage device 1200 may transfer the response UPIU to the host 1100 while moving data (or at the same time when the data are moved).

When the activate mode information AM indicates a second mode, the storage device 1200 may perform operation S430 to operation S445. Referring to operation S430, the storage device 1200 may receive the command UPIU including the read information RD and the move information MV from the host 1100. Referring to operation S435, the storage device 1200 may transfer the read data to the host 1100 through the DATA IN UPIU in response to the read information RD of the command UPIU.

Referring to operation S440, the storage device 1200 may transfer the response UPIU to the command UPIU. Referring to operation S445, the storage device 1200 may move data in response to the move information MV of the command UPIU. For example, when the activate mode information AM indicates the second mode, the storage device 1200 may move data after transferring the response UPIU to the host 1100.

When the activate mode information AM indicates a third mode, the storage device 1200 may perform operation S450 to operation S470. Referring to operation S450, the storage device 1200 may receive the command UPIU including the read information RD and the move information MV from the host 1100.

Referring to operation S455, the storage device 1200 may transfer the read data to the host 1100 through the DATA IN UPIU in response to the read information RD of the command UPIU. Referring to operation S460, the storage device 1200 may move a first portion of data in response to the move information MV of the command UPIU. Referring to operation S465, the storage device 1200 may transfer the response UPIU to the command UPIU.

Referring to operation S470, the storage device 1200 may move a second portion of the data in response to the move information MV of the command UPIU. For example, when the activate mode information AM indicates the third mode, the storage device 1200 may partially move data before and after transferring the response UPIU to the host 1100.

The activate mode information AM may be determined in consideration of an operating speed of the storage device 1200, a timeout time of a read operation promised between the host 1100 and the storage device 1200, etc.

Figure 16:
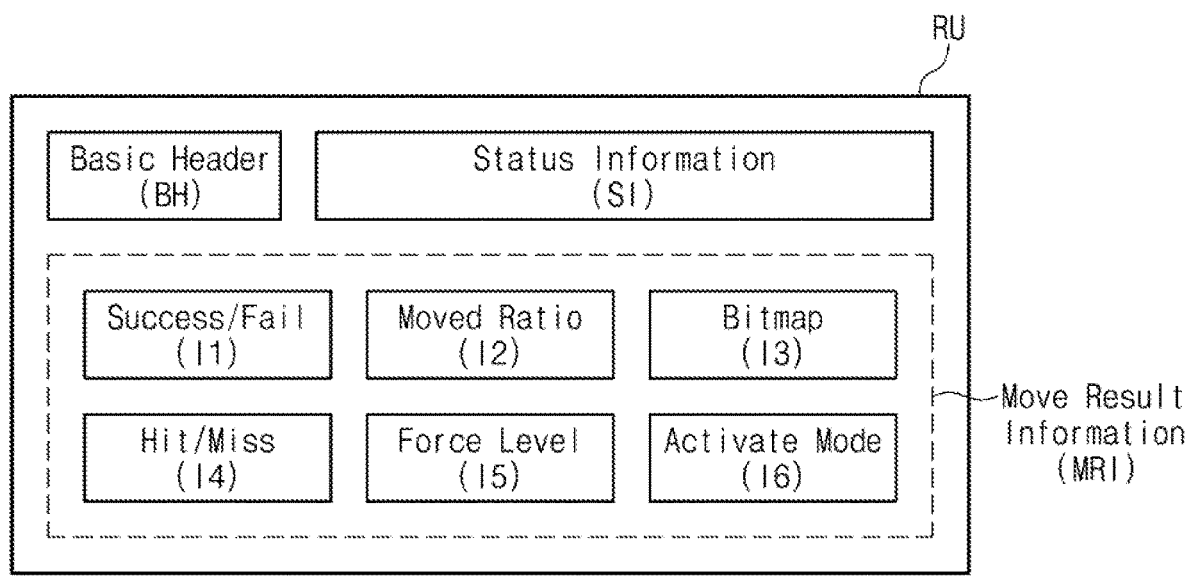
FIG. 16 illustrates an example of a response UPIU of FIG. 11.

FIG. 16 illustrates an example of the response UPIU RU of FIG. 11. Referring to FIGS. 1 and 16, the response UPIU may include at least one of the basic header BH, status information SI including a result of a read operation, and move result information MRI including a result of a move operation.

The move result information MRI may include first to sixth information I1 to I6. The first information I1 may indicate whether a move operation is a success or a failure. The second information I2 may indicate a ratio of data moved through the move operation (i.e., a ratio for move target data).

The third information I3 may include a bitmap indicating a location of data after the move operation. The fourth information I4 may indicate that all or a portion of the move target data are already stored (i.e., a hit occurs) or that the move target data are not stored (i.e., a miss occurs). The fifth information I5 may indicate the force level information FL applied to the move operation. The sixth information I6 may include the activate mode information AM applied to the move operation.

As described with reference to the second mode and the third mode of FIG. 15, the move operation of data may not be completed at a time to transfer the response UPIU RU. In this case, the controller 1210 may include an expected result of the move operation in the response UPIU RU as the move result information MRI.

For example, the first information I1 may indicate the expected result instead of the success or fail. The second information I2 and the third information I3 may include expected results that are calculated (or determined) by the controller 1210 based on the move attributes MA. The fourth information I4 may determine a time at which the controller 1210 receives a logical address of the read information RD. The fifth information I5 and the sixth information I6 may be checked by the controller 1210 from the move attributes MA.

After the move operation is completed, the storage device 1200 may record at least one of the first to sixth information I1 to I6 of the move result information MRI at move feedback attributes. The storage device 1200 may transfer the move feedback attributes to the host 1100 in response to a request (e.g., a query request) of the host 1100.

Figure 17:
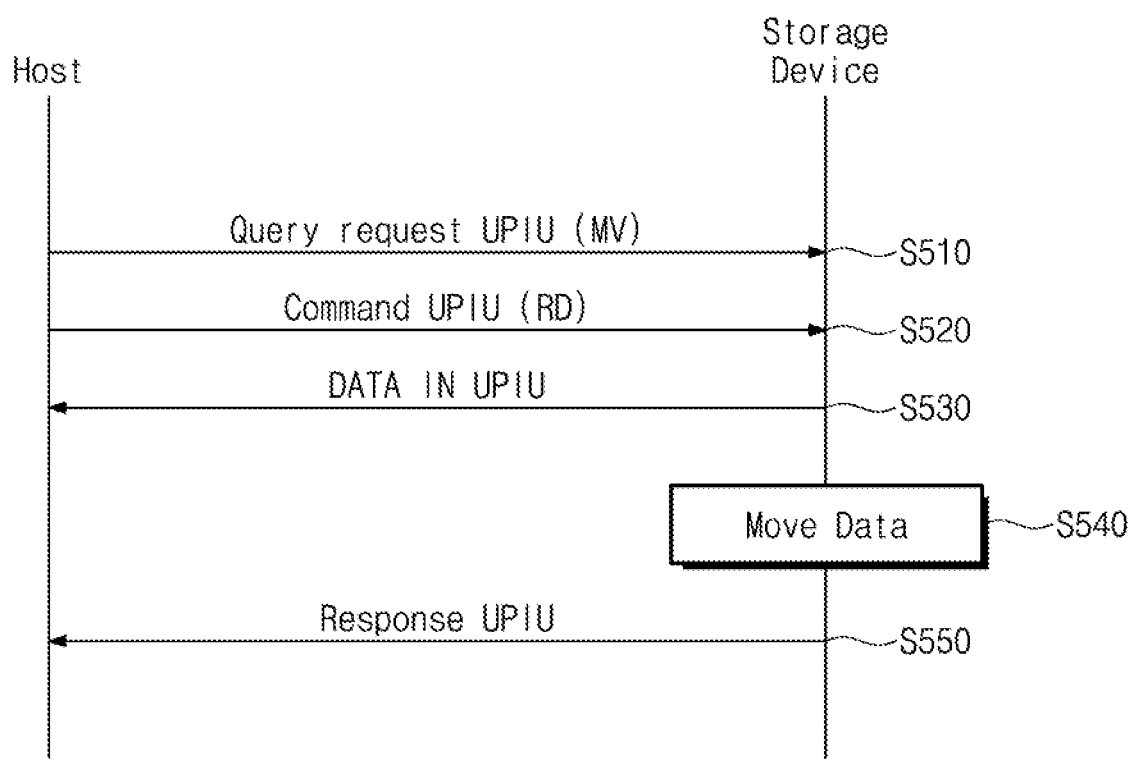
FIGS. 17 and 18 illustrate an example in which a storage device performs a move operation of data in combination of a query request UPIU QU and a command UPIU.
Figure 18:
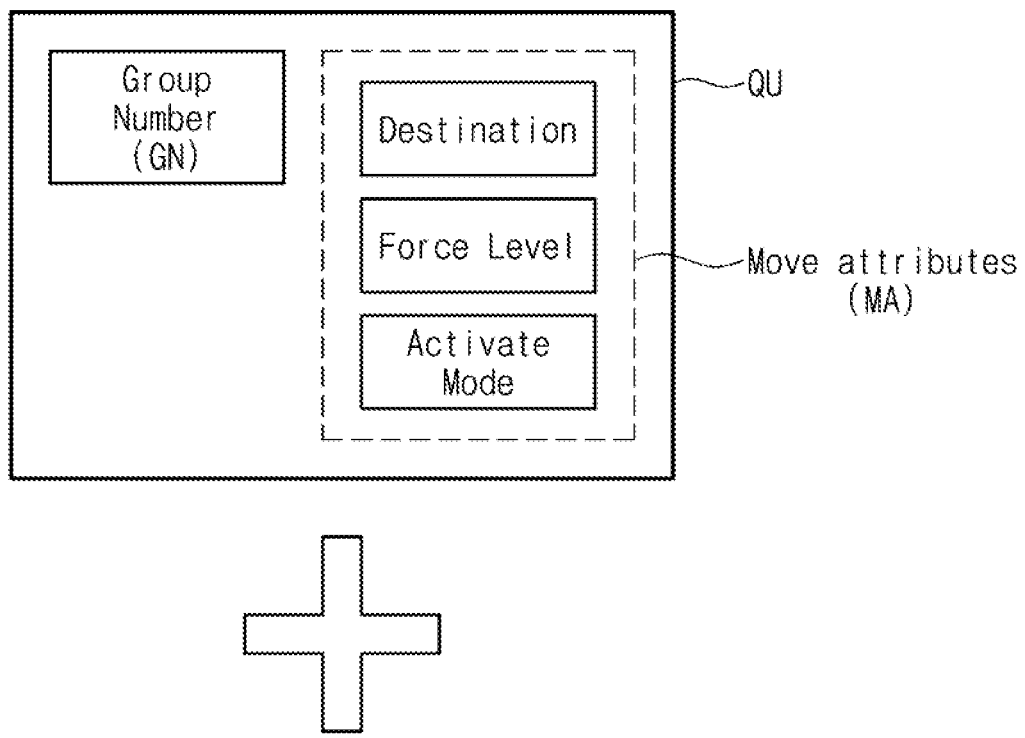
Figure 18:
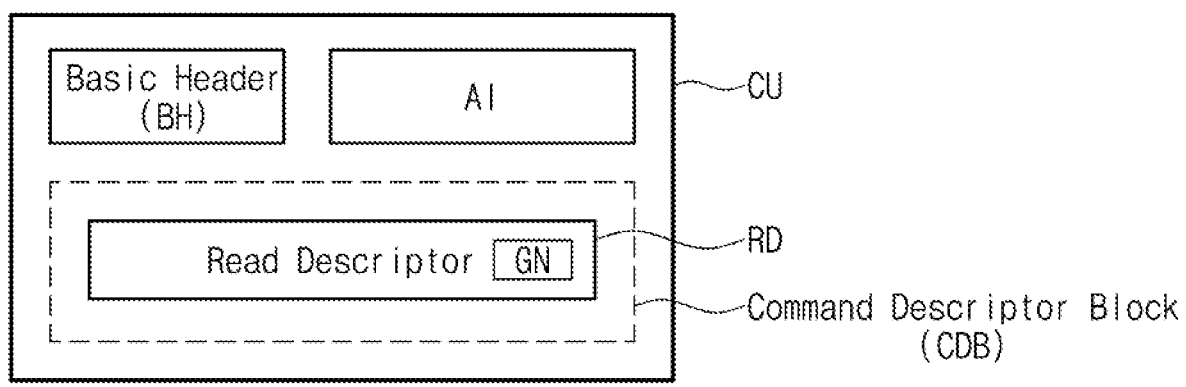

FIGS. 17 and 18 illustrate an example in which the storage device 1200 performs a move operation of data in combination of a query request UPIU QU and the command UPIU. Referring to FIGS. 17 and 18, in operation S510, the storage device 1200 may receive the query request UPIU QU including the move information MV. The query request UPIU QU may include the group number GN as the move information MV and move attributes MA.

The move attributes may be identical or similar to that described with reference to the move information MV in FIG. 12. The group number GN may be a number that the host 1100 randomly gives to data in a write operation of data to distinguish data of similar contexts.

In response to the query request UPIU QU, the storage device 1200 may set the move attributes MA of the data corresponding to the group number GN. Following the query request UPIU QU, referring to operation S520, the storage device 1200 may receive the command UPIU CU.

The command UPIU CU may include the basic header BH, the additional information AI, and the command descriptor block CDB.

The command descriptor block CDB may include a read descriptor as the read information RD. The read information RD may include the group number GN. Based on the read information RD, referring to operation S530, the storage device 1200 may read data of a logical address included in the read information RD and may output the read data to the host 1100 through the DATA IN UPIU.

In a case where the move attributes MA of the data corresponding to the received group number GN have been set, referring to operation S540, the storage device 1200 may move the data of the logical address included in the read information RD based on the move attributes MA. Referring to operation S550, the storage device 1200 may transfer the response UPIU to the host 1100.

For example, the storage device 1200 may communicate other UPIUs with the host 1100 between operation S510 in which the query request UPIU QU is received and operation S520 in which the command UPIU CU is received. For example, after the storage device 1200 sets the move attributes MA, the host 1100 may direct the move operation to the storage device 1200 when there is no need to access the storage device 1200.

For example, the move attributes MA for two or more group numbers may be set by two or more query request UPIUs. The storage device 1200 may compare the group number included in the read information RD of the command UPIU with each of the two or more group numbers to which the two or more move attributes MA are set and may selectively perform the move operation based on a comparison result.

For example, as described with reference to FIG. 16, a time of the move operation of data and a time to transfer the response UPIU may vary based on the activate mode information AM. Also, the response UPIU may be configured based on the description given with reference to FIG. 16.

As a first scheme for moving data in response to the command UPIU including the read information RD (or a read command), the storage device 1200 may receive the move attributes MA included in the command UPIU as described with reference to FIG. 12. The move attributes MA included in the command UPIU may be single-use attributes and may trigger an immediate (or prompt) move operation.

As a second scheme, as described with reference to FIG. 18, the storage device 1200 may receive the move attributes MA included in the query request UPIU. The move attributes MA included in the query request UPIU may be applied to data of a group number GN and do not trigger the move operation. The move attributes MA applied to the data of the group number GN may be applied to the move operation performed in response to the command UPIU including the read information RD with the same group number GN.

For example, after the move attributes MA are set to the data of the group number GN by the query request UPIU, the move attributes MA may also be included in the move information MV of the command UPIU for a portion of the of the group number GN. In this case, the storage device 1200 may first apply the move attributes MA of the move information MV included in the command UPIU or may determine that an error occurs.

Figure 19:
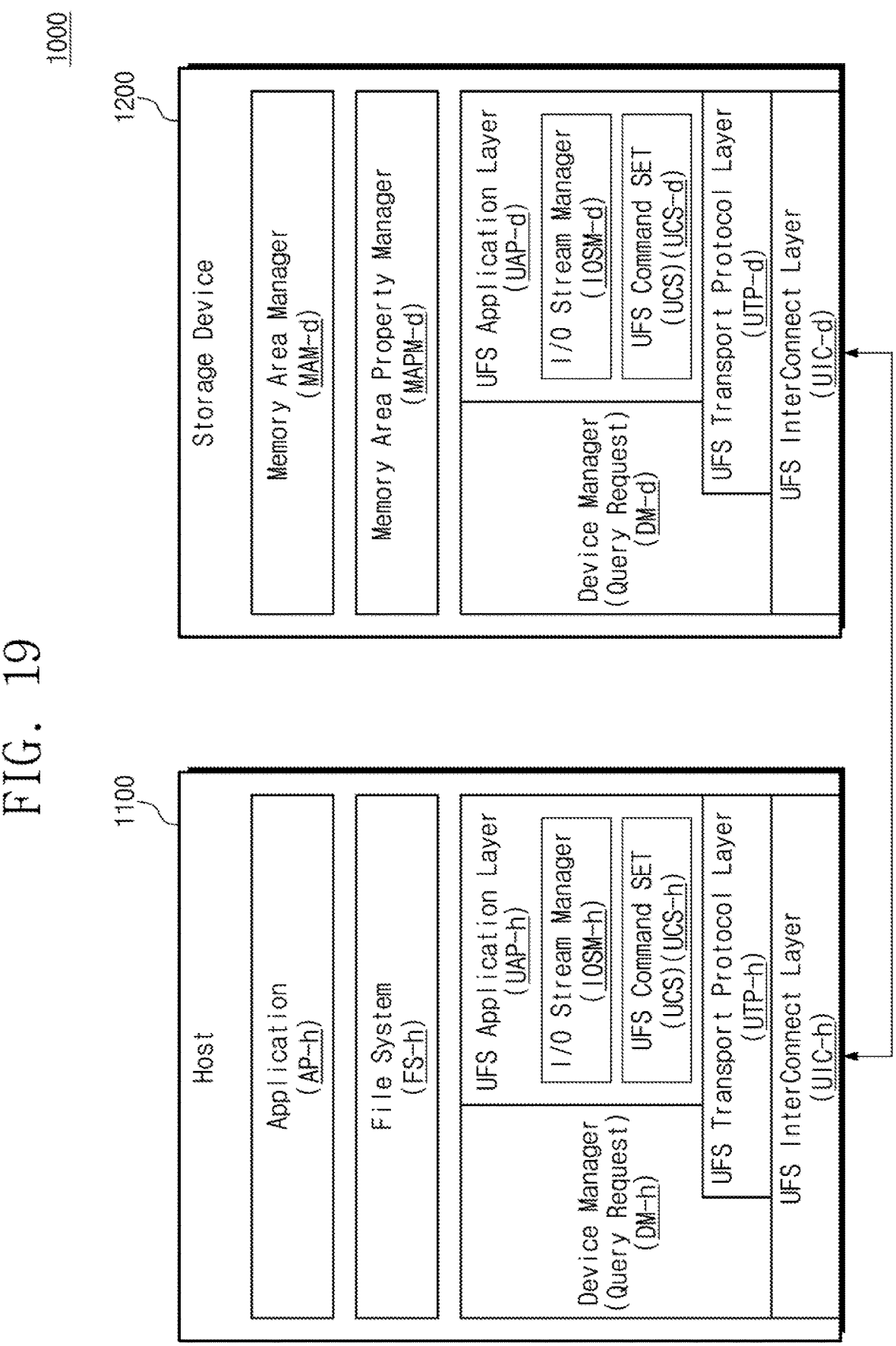
FIG. 19 is a diagram illustrating a hierarchical structure of a storage system of FIG. 1.

FIG. 19 is a diagram illustrating a hierarchical structure of the storage system 1000 of FIG. 1. Referring to FIG. 19, the storage system 1000 may include the host 1100 and the storage device 1200. The host 1100 may include an application AP-h, a file system FS-h, a device manager DM-h, a UFS application layer UAP-h, a UFS transport protocol layer UTP-h, and a UFS interconnect layer UIC-h.

The application AP-h may include various application programs, processes, etc. that are driven at the host 1100. The file system FS-h may be configured to organize and manage a variety of data generated by the application AP-h. In an exemplary embodiment of the inventive concept, the application AP-h or the file system FS-h may be configured to determine a logical block address range to specify a logical block address range for a particular area. Information about the determined logical block address range may be provided to a lower layer (e.g., the device manager DM-h or the UFS application layer UAP-h).

The UFS application layer UAP-h is configured to support various commands between the host 1100 and the storage device 1200. For example, the UFS application layer UAP-h may include an input/output (I/O) stream manager IOSM-h and a UFS command set UCS-h. The I/O stream manager IOSM-h is configured to manage a request from the application AP-h or the file system FS-h.

In an exemplary embodiment of the inventive concept, the I/O stream manager IOSM-h may be configured to identify a particular value of an input/output from the application AP-h or the file system FS-h. The I/O stream manager IOSM-h may be configured to manage a priority of a request from the application AP-h or the file system FS-h or to support various functions according to the request from the application AP-h or the file system FS-h. In an exemplary embodiment of the inventive concept, the I/O stream manager IOSM-h may be configured to support the turbo write function or the turbo read function.

In an exemplary embodiment of the inventive concept, a particular application or process specified by the host 1100 or a user of the host 1100 may use the turbo write or the turbo read. The I/O stream manager IOSM-h may determine whether to perform the turbo write or the turbo read in response to a write or read request that is made by the particular application or process with regard to the storage device 1200.

In addition, particular data that are managed by the file system FS-h may use the turbo write or the turbo read. The I/O stream manager IOSM-h may determine whether to perform the turbo write or the turbo read in response to the write or read request for the storage device 1200 with regard to particular data (e.g., meta data).

In addition, the I/O stream manager IOSM-h may direct a move of data written in the storage device 1200. The I/O stream manager IOSM-h may adjust a read speed of data written in the storage device 1200 by moving data to the pinned turbo write buffer TWB-p, the non-pinned turbo write buffer TWB-np, or the user storage UST.

In an exemplary embodiment of the inventive concept, the I/O stream manager IOSM-h may determine an area (e.g., the pinned turbo write buffer TWB-p, the non-pinned turbo write buffer TWB-np, or the user storage UST) in which particular data are to be stored depending on attributes of the particular data and may provide information about the determination (e.g., the area information ARI) to the UFS command set UCS-h.

In an exemplary embodiment of the inventive concept, the I/O stream manager IOSM-h may determine a logical block address, at which the particular data are to be stored, based on the attributes of the particular data and a predetermined logical block address range and may provide information about the determined logical block address range to the UFS command set UCS-h.

The UFS command set UCS-h may support various command sets that are supported between the host 1100 and the storage device 1200. In an exemplary embodiment of the inventive concept, the UFS command set UCS-h may include a UFS native command set and a UFS SCSI command set. The UFS command set UCS-h may configure a command to be transferred to the storage device 1200 depending on a request from the application AP-h or the file system FS-h.

In an exemplary embodiment of the inventive concept, the UFS command set UCS-h may be configured to receive various information (e.g., a logical block address, area information, a logical block address range, or range area information) from the I/O stream manager IOSM-h and to generate various commands.

The UFS application layer UAP-h may further include a task manager that processes commands for a control of a command queue.

The device manager DM-h may manage operations of a device level and configurations of a device level. In an exemplary embodiment of the inventive concept, the device manager DM-h may manage a query request for setting or checking various information of the storage device 1200.

The UFS transport protocol layer UTP-h may provide services for an upper layer. The UFS transport protocol layer UTP-h may generate a command or information provided from the UFS application layer UAP-h, or a query request provided from the device manager DM-h in the form of a UPIU (UFS Protocol Information Unit) packet.

In an exemplary embodiment of the inventive concept, the UFS transport protocol layer UTP-h and the device manager DM-h may communicate with each other through a UDM-SAP (UDM-Service Access Point). The UFS transport protocol layer UTP-h and the UFS application layer UAP-h may communicate with each other through a UTP_CMD_SAP or a UTP_TM_SAP.

The UFS interconnect layer UIC-h may manage a connection with the storage device 1200. In an exemplary embodiment of the inventive concept, the UFS interconnect layer UIC-h may include hardware configurations such as an MIPI Unipro or an MIPI M-PHY physically connected with the UFS interconnect layer UIC-d of the storage device 1200. This way the host 1100 and storage device 1200 can establish a communication channel with each other. In an exemplary embodiment of the inventive concept, the UFS interconnect layer UIC-h and the UFS transport protocol layer UTP-h may communicate through a UIC-SAP, and the UFS interconnect layer UIC-h and the device manager DM-h may communicate through a UIO-SAP.

The storage device 1200 may include a memory area manager MAM-d, a memory area property manager MAPM-d, a device manager DM-d, a UFS application layer UAP-d, a UFS transport protocol layer UTP-d, and a UFS interconnect layer UIC-d. In an exemplary embodiment of the inventive concept, a configuration of the UFS application layer UAP-d, the UFS transport protocol layer UTP-d, and the UFS interconnect layer UIC-d may be similar to that of the UFS application layer UAP-h, the UFS transport protocol layer UTP-h, and the UFS interconnect layer UIC-h of the host 1100 and allows corresponding layers to logically communicate with each other, and thus, additional description will be omitted to avoid redundancy.

The memory area property manager MAPM-d of the storage device 1200 may specify and manage an area where write data received from the host 1100 are to be stored. For example, as described above, depending on the explicit request of the host 1100 or the internal policy, the write data received from the host 1100 may be written in a space of at least one of the pinned turbo write buffer TWB-p, the non-pinned turbo write buffer TWB-np, and the user storage UST. The memory area property manager MAPM-d may select a space, in which the write data received from the host 1100 are to be stored, based on the various schemes described above and may store the write data in the selected space.

As described above, depending on the explicit request of the host 1100 or the internal policy, the memory area manager MAM-d of the storage device 1200 may control data move/flush/migration between the pinned turbo write buffer TWB-p, the non-pinned turbo write buffer TWB-np, and the user storage UST.

The above hierarchical structure and function of each of the host 1100 and the storage device 1200 is merely exemplary, and the inventive concept is not limited thereto.

Figure 20:
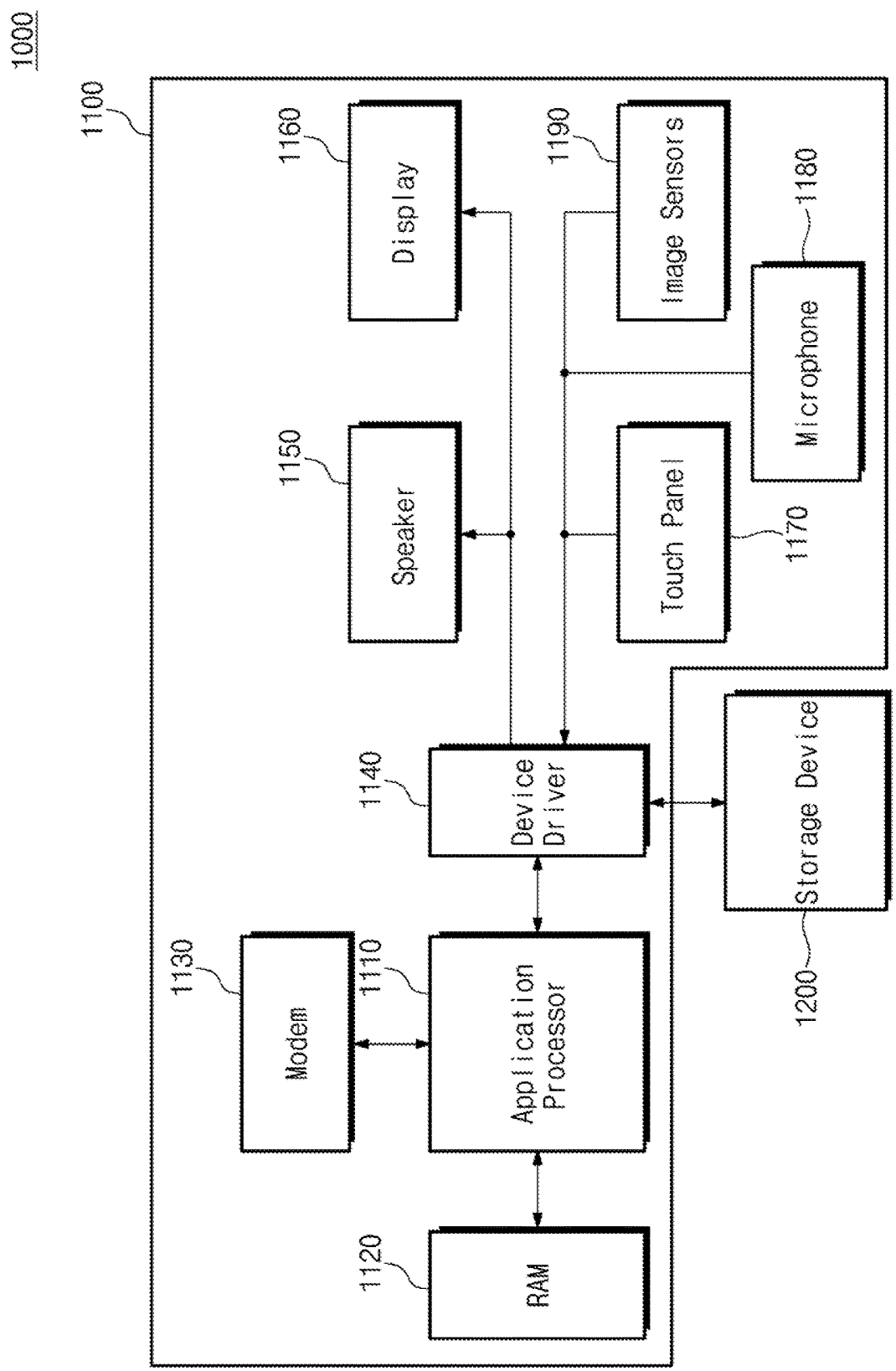
FIG. 20 is a block diagram illustrating a storage system according to an embodiment of the inventive concept in detail.

FIG. 20 is a block diagram illustrating the storage system 1000 according to an exemplary embodiment of the inventive concept in detail. Referring to FIGS. 19 and 20, the storage system 1000 may include the host 1100 and the storage device 1200. The host 1100 and the storage device 1200 may operate as described with reference to FIGS. 1 to 19.

The host 1100 may include an application processor 1110, a random access memory (RAM) 1120, a modem 1130, a device driver 1140, a speaker 1150, a display 1160, a touch panel 1170, a microphone 1180, and image sensors 1190.

The application processor 1110 may execute the application AP-h and the file system FS-h. The application processor 1110 may use the RAM 1120 as a system memory. The application processor 1110 may communicate with an external device through the modem 1130 in a wired fashion or wirelessly. For example, the modem 1130 may be embedded in the application processor 1110.

The application processor 1110 may communicate with peripheral devices through the device driver 1140. For example, the application processor 1110 may communicate with the speaker 1150, the display 1160, the touch panel 1170, the microphone 1180, the image sensors 1190, and the storage device 1200 through the device driver 1140.

The device driver 1140 may include the device manager DM-h, the UFS application layer UAP-h, the UFS transport protocol layer UTP-h, and the UFS interconnect layer UIC-h. For example, the device driver 1140 may be embedded in the application processor 1110.

The speaker 1150 and the display 1160 may be user output interfaces that transfer information to the user. The touch panel 1170, the microphone 1180, and the image sensors 1190 may be user input interfaces that receive information from the user.

In an exemplary embodiment of the inventive concept, the storage device 1200 may be used as a high-capacity storage medium of the host 1100. The storage device 1200 may be an embedded type of UFS device or a memory card type of UFS device. The UFS device of the memory card type may be inserted into or detached from an UFS slot included in the host 1100.

FIG. 21 illustrates a diagram in which an exemplary embodiment of the inventive concept is applied to the storage system 1000. Referring to FIGS. 20 and 21, the storage system 1000 may provide setting screens through the display 1160. One of the setting screens may provide information of an acceleration mode to the user.

The storage system 1000 may display a list of first to n-th applications APP1 to APPn, to which the acceleration modes are applicable, through the display 1160. In addition, the storage system 1000 may display, through the display 1160, switches that allow the user to adjust the acceleration modes of the first to n-th applications APP1 to APPn.

In operation S1100, the user may touch an enable location of the acceleration mode of the third application APP3. The storage system 1000 may sense a touch of the user, in other words, the directions activating the third application APP3 through the touch panel 1170. In operation S1200, information of the third application APP3 or processes of the third application APP3 may be transferred to the I/O stream manager IOSM-h.

As the information of the third application APP3 or the processes of the third application APP3 are received, in operation S1300, the I/O stream manager IOSM-h may reserve a move operation of a subsequent read of the third application APP3 or the processes thus selected. For example, the I/O stream manager IOSM-h may set the move attributes MA with respect to data associated with the third application APP3 through the query request UPIU and may include a move flag as the move information MV in the CMD UPIU when a read operation associated with the third application APP3 is required.

As another example, the I/O stream manager IOSM-h may include a move flag and the move attributes MA as the move information MV in the CMD UPIU when a read operation associated with the third application APP3 is required. For example, the I/O stream manager IOSM-h may specify the pinned turbo write buffer TWB-p or the non-pinned turbo write buffer TWB-np as the destination information DST of the move attributes MA.

When the data associated with the third application APP3 are moved to the pinned turbo write buffer TWB-p or the non-pinned turbo write buffer TWB-np, an operation of reading the data associated with the third application APP3 is accelerated. Accordingly, the performance of the third application APP3 may be accelerated.

For example, in a case where the acceleration mode of the third application APP3 is disabled, the I/O stream manager IOSM-h may reserve the move operation of subsequent read of the third application APP3, for example, the move operation to the user storage UST or the non-pinned turbo write buffer TWB-np.

In the above embodiments, the inventive concept is described with reference to the UFS protocol. However, the inventive concept is not limited to the UFS protocol and may be applied to various protocols.

In the above-described embodiments, components of the storage system 1000 are described by using the terms "first", "second", "third", and the like. However, the terms "first", "second", "third", and the like may be used to distinguish components from each other and do not limit the inventive concept. For example, the terms "first", "second", "third", and the like do not involve an order or a numerical meaning of any form.

In the above embodiments, components according to embodiments of the inventive concept are described by using blocks. The blocks may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit or circuits enrolled as intellectual property (IP)

According to the inventive concept, a storage device provides a turbo write buffer supporting faster write and read than user storage. The storage device supports a preferred write on the turbo write buffer and supports to move data of the user storage to the turbo write buffer. Accordingly, the storage device with increased write and read speeds is provided.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A storage device comprising:
a nonvolatile memory device including a first area, a second area, and a third area; and
a controller configured to receive a write command and first data from an external host device, to preferentially write the first data in the first area or the second area rather than the third area when the first data are associated with a turbo write, and to write the first data in the first area, the second area, or the third area based on a normal write policy when the first data are associated with a normal write,
wherein the controller is further configured to receive a read command from the external host device, to read second data from the first area, the second area, or the third area based on the read command, and to output the second data to the external host device,
wherein the controller is further configured to move the second data from an area in which the second data are stored to another area from among the first area, the second area and the third area in response to move information of the read command when the read command is received together with the move information,
wherein the controller is further configured to output a response corresponding to the read command to the external host device,
wherein the response includes first information indicating whether a movement of the second data is a success or a failure,
wherein the move information includes information of a destination area, to which the second data are to be moved, from among the first area, the second area, and the third area, and
wherein the controller is further configured to move a first portion of the second data that corresponds to a free capacity of the destination area when the free capacity of the destination area, to which the second data are to be moved, is smaller than a capacity of the second data.

2. The storage device of claim 1, wherein the controller is further configured to leave a second portion of the second data without moving the second portion when the free capacity of the destination area, to which the second data are to be moved, is smaller than the capacity of the second data.

3. The storage device of claim 1, wherein the controller is configured to evict partial data of third data stored in the destination area, and to leave a second portion of the second data without moving the second portion of the second data to the destination area, when the free capacity of the destination area to which the second data are to be moved is smaller than the capacity of the second data.

4. The storage device of claim 1, wherein the controller is further configured to evict partial data of third data stored in the destination area to secure a free capacity corresponding to the capacity of the second data at the destination area, and to move a second portion of the second data to the destination area, when the free capacity of the destination area to which the second data are to be moved is smaller than the capacity of the second data.

5. The storage device of claim 1, wherein, when the free capacity of the destination area to which the second data are to be moved is smaller than the capacity of the second data, the move information further includes force level information including whether to evict partial data of third data stored in the destination area or whether to leave partial data of the second data without moving the partial data.

6. The storage device of claim 1, wherein the controller is further configured to set whether to evict partial data of third data stored in the destination area or whether to leave partial data of the second data without moving partial data, in response to a query request received from the external host device, when the free capacity of the destination area to which the second data are to be moved is smaller than the capacity of the second data.

7. The storage device of claim 1, wherein the move information includes activate mode information indicating a first time at which the controller enables a movement of the second data and a second time at which the controller transfers the response corresponding to the read command to the external host device.

8. The storage device of claim 1, wherein the controller is further configured to output the second data to the external host device, to move the second data, and to output the response corresponding to the read command to the external host device.

9. The storage device of claim 1, wherein the controller is further configured to output the second data to the external host device, to output the response corresponding to the read command to the external host device, and afterwards to move the second data.

10. The storage device of claim 1, wherein the controller is further configured to output the second data to the external host device, to move partial data of the second data, to output the response corresponding to the read command to the external host device, and afterwards to move remaining data of the second data.

11. The storage device of claim 1,
wherein the response further includes:
second information indicating a ratio of moved data of the second data;
third information including a bitmap after the second data are moved;
fourth information indicating whether a hit or a miss occurs in the movement of the second data;
fifth information indicating a force level used in the movement of the second data; and
sixth information indicating an activate mode used in the movement of the second data.

12. The storage device of claim 11, wherein the controller is further configured to record at least one of the first to sixth information at move feedback attributes and to transfer the move feedback attributes to the external host device in response to a query request received from the external host device.

13. A storage device comprising:
a nonvolatile memory device including a first area, a second area, and a third area; and
a controller configured to receive a write command and first data from an external host device, to preferentially write the first data in the first area or the second area rather than the third area when the first data are associated with a turbo write, and to write the first data in the first area, the second area, or the third area based on a normal write policy when the first data are associated with a normal write, wherein the controller is further configured to receive a query request including a first group number and move information from the external host device and to set move attributes to data corresponding to the first group number based on the move information, and wherein the controller is further configured to receive a read command including a logical address and a second group number following the query request, to read second data corresponding to the logical address from the first area, the second area, or the third area, to output the second data to the external host device, and to move the second data based on the move attributes when the second group number is matched with the first group number.

14. The storage device of claim 13, wherein the write command includes a third group number given to the first data.

15. The storage device of claim 13, wherein the controller is further configured to transfer a response including move result information of the second data to the external host device in response to the read command.

16. The storage device of claim 13, wherein the move information includes at least one of:
    information of a destination area, to which the second data are to be moved, from among the first area, the second area, and the third area;
    information of a scheme to move the second data when a free capacity of the destination area is smaller than a capacity of the second data; and
    activate mode information indicating a first time at which the controller enables a movement of the second data and a second time at which the controller transfers a response corresponding to the read command to the external host device.

17. A storage device comprising:
    a nonvolatile memory device including a first area, a second area, and a third area; and
    a controller configured to receive a read command from an external host device, to read data from the first area, the second area, or the third area based on the read command, to output the data to the external host device, and to move the data from an area in which the second data are stored to another area from among the first area, the second area, and the third area in response to the read command,
    wherein the controller is further configured to output a response corresponding to the read command to the external host device,
    wherein the response includes information indicating whether a movement of the second data is a success or a failure,
    wherein the information includes information of a destination area, to which the data are to be moved, from among the first area, the second area, and the third area, and
    wherein the controller is further configured to move a first portion of the data that corresponds to a free capacity of the destination area when the free capacity of the destination area, to which the second data are to be moved, is smaller than a capacity of the second data.

18. The storage device of claim 17, wherein the controller is configured to set move attributes of the data in response to a query request received before the read command and to move the data based on the move attributes in response to the read command.

19. The storage device of claim 17, wherein the controller is further configured to move the data based on move attributes included in the read command.

* * * * *